US005219638A

United States Patent [19]

Imamura et al.

[11] Patent Number: 5,219,638

[45] Date of Patent: Jun. 15, 1993

[54] THERMAL TRANSFER SHEET

[75] Inventors: Hirokatsu Imamura; Koichi Nakamura; Jiro Ohnishi, all of Tokyo, Japan

[73] Assignee: Dai Nippon Insatsu Kabushiki Kaisha, Japan

[21] Appl. No.: 560,593

[22] Filed: Jul. 31, 1990

[30] Foreign Application Priority Data

| | | | |
|---|---|---|---|
| Aug. 2, 1989 | [JP] | Japan | 1-202234 |
| Jan. 31, 1990 | [JP] | Japan | 2-19324 |
| May 24, 1990 | [JP] | Japan | 2-132605 |
| Jun. 5, 1990 | [JP] | Japan | 2-146523 |
| Jun. 5, 1990 | [JP] | Japan | 2-146525 |
| Jun. 5, 1990 | [JP] | Japan | 2-146526 |

[51] Int. Cl.[5] .............. B32B 9/00

[52] U.S. Cl. .............. 428/195; 428/204; 428/207; 428/340; 428/484; 428/522; 428/913

[58] Field of Search .............. 428/488.4, 914, 195, 428/207, 913, 206, 423.1, 204, 340, 484, 522

[56] References Cited

U.S. PATENT DOCUMENTS 4,732,815 3/1988 Mizobuchi et al. .............. 428/488.4

FOREIGN PATENT DOCUMENTS 0173532 3/1986 European Pat. Off. .
3634049 9/1987 Fed. Rep. of Germany .
60-116968 12/1986 Japan .
60271347 6/1987 Japan .
6197078 11/1987 Japan .

*Primary Examiner*—Patrick J. Ryan
*Assistant Examiner*—W. Krynski
*Attorney, Agent, or Firm*—Ladas & Parry

[57] ABSTRACT

A thermal transfer sheet which is capable of preventing ground staining, trailing, etc., at the time of printing and has been improved in image density, resolution, etc., is provided by forming a sensitizing layer having a lower melt viscosity than an ink layer between the ink layer and a substrate film, even when such a thermal transfer sheet is used for an n-fold recording mode. Further, a thermal transfer sheet suitable for an n-fold recording mode which is capable of uniformly transferring an ink layer, is capable of preventing white dropout, ground staining, trailing, etc., at the time of printing, and has been improved in image density, resolution, etc., is provided by forming a surface layer on the surface of the ink layer, and forming the ink layer and surface layer so that the ink layer has a melt viscosity of 1000–5000 cps at 100° C. and the surface layer has a melt viscosity of 2000–10000 cps at 150° C.

22 Claims, 1 Drawing Sheet

THERMAL TRANSFER SHEET

FIELD OF THE INVENTION AND RELATED ART

The present invention relates to a thermal transfer sheet, and, more specifically, to a thermal transfer sheet capable of preventing ground staining or trailing at the time of printing and of providing printed letters improved in image density and resolution, when used in a thermal transfer method wherein the moving speed of a transfer-receiving material is higher than that of the thermal transfer material (hereinafter, such a recording mode simply referred to as "n-fold recording mode").

Hitherto, in a case where output from a computer or word processor is printed by a thermal transfer system, there has been used a thermal transfer sheet comprising a substrate film and a heat-fusible ink layer disposed on one surface side thereof.

Such a conventional thermal transfer sheet comprises a substrate film comprising a paper having a thickness of 10 to 20 μm such as capacitor paper and paraffin paper, or comprising a plastic film having a thickness of 3 to 20 μm such as polyester film and cellophane film. The above-mentioned thermal transfer sheet has been prepared by coating the substrate film with a heat-fusible ink comprising a wax and a colorant such as dye or pigment mixed therein, to form a recording material layer on the substrate film.

One of the problems encountered in the above-mentioned conventional thermal transfer sheet is an economic problem such that a portion of the conventional thermal transfer sheet is only capable of conducting a single printing operation and therefore the thermal transfer sheet is consumed in a length which is the same that of the resultant printed letters.

As the method of solving such a problem, there has been known a method using a thermal transfer sheet for multiple use which is capable of conducting plural printing operations by using the same portion thereof. In this method, however, the resultant image density is decreased as the number of printing operations becomes large, whereby it is difficult to provide printed letters having uniform image densities.

As another method of solving the above-mentioned problem, there has been proposed an n-fold recording method wherein printing is effected so that the moving speed of a transfer-receiving material is higher than that of a thermal transfer sheet used in combination therewith (the moving directions of the thermal transfer sheet and the transfer-receiving material may be the same or reverse to each other). In this method, when the moving speed of the transfer-receiving material is represented by N, the moving speed of the thermal transfer material is represented by N', and N>N', the length of the printed partion is N, but the length of the consumed thermal transfer sheet is N'. Accordingly, for example, it is supposed that N=5 and N'=1, the length of the consumed thermal transfer sheet is 1/5 times that in the prior art. As a result, such a method is fairly economical.

In this method, however, since the transfer-receiving material and the termal transfer sheet are moved so that they are rubbed with each other, ground staining and printed letter trailing are liable to occur, whereby it is difficult to obtain clear printed letters having a high resolution.

In order to solve the problem of ground staining, Japanese Laid-Open Patent Publication (JP-A, KOKAI) No. 178088/1985 has proposed a method wherein a colorless wax layer is formed on the surface of an ink layer. However, since such a surface layer is removed by the above-mentioned rubbing, the problem is not sufficiently solved.

On the other hand, in order to solve the trailing, there has been proposed a method wherein an ink layer is formed by using a wax having a relatively high melting point. In this method, however, the ink layer cannot provided a good wetting property with respect to the transfer-receiving material. Accordingly, in the case of a transfer-receiving material such as paper having a rough surface, void (or white dropout) is liable to occur, whereby it is difficult to obtain printed letters having high image density and high resolution.

Further, Japanese Laid-Open Patent Publication No. 11381/1988 proposes a thermal transfer sheet wherein a layer predominantly comprising a wax is disposed between a substrate film and an ink layer predominantly comprising a vehicle of heat-fusible synthetic resin, so that the transferability of the ink layer to a transfer-receiving material is improved. In the n-fold recording method, however, such simple provision of the wax layer cannot effectively prevent the occurrence of void, whereby it is difficult to provide printed letters having high image density and high resolution.

SUMMARY OF THE INVENTION

An object of the present invention is to solve the above-mentioned problems encountered in the prior art and to provide a thermal transfer sheet which is capable of preventing ground staining or trailing at the time of printing and is capable of providing printed letters improved in image density, resolution, etc.

According to a first aspect of the present invention, there is provided a thermal transfer sheet comprising a substrate film, a sensitizing layer formed on one surface side of the substrate film, and an ink layer formed on the surface of the sensitizing layer, wherein the sensitizing layer and the ink layer are heat-fusible, and the sensitizing layer has a melt viscosity which is lower than that of the ink layer.

The above-mentioned thermal transfer sheet provides images improved in image density and resolution without causing ground staining or void when using of an ink having a high melt viscosity in order to prevent from causing trailing at the time of printing, even in the case of an n-fold recording method.

According to a second aspect of the present invention, there is provided a thermal transfer sheet comprising a substrate film, an ink layer formed on one surface side of the substrate film, and a surface layer formed on the surface of the ink layer, wherein the ink layer has a melt viscosity of 1000–5000 cps at 100° C., and the surface layer has a melt viscosity of 2000–10000 cps at 150° C.

The above-mentioned thermal transfer sheet is one for an n-fold recording mode capable of providing images improved in image density and resolution as a consequence of prevention of causing ground staining, trailing and void at the time of printing.

DETAILED DESCRIPTION OF PREFERRED EMBODIMENTS

Hereinbelow, the present invention is specifically described with reference to the accompanying drawings.

Figure 1:
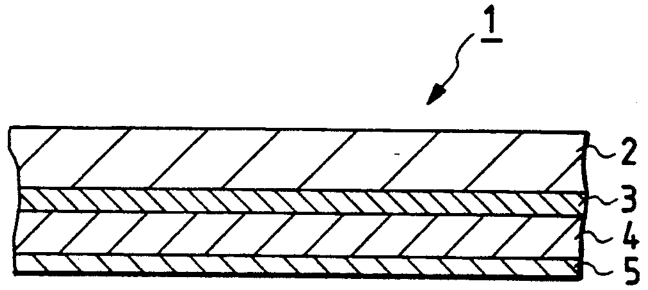
FIG. 1 is a schematic sectional view showing an embodiment of the thermal transfer sheet according to the present invention.

FIG. 1 is a schematic sectional view showing an embodiment of the thermal transfer sheet according to the present invention. Referring to FIG. 1, the thermal transfer sheet 1 comprises a substrate film 2, a sensitizing layer 3, an ink layer 4, and a surface layer 5 formed on one other surface side of the substrate film 2. The above-mentioned substrate film 2 is one capable of contacting a thermal head.

The substrate film 2 to be used in the present invention may be one selected from those used in the conventional thermal transfer sheet. However, the above-mentioned substrate film 2 is not restricted thereto and can be any of other films.

Preferred examples of the substrate film 2 may include: plastic films such as those comprising polyester, polypropylene, cellophane, polycarbonate, cellulose acetate, polyethylene, polyvinyl chloride, polystyrene, nylon, polyimide, polyvinylidene chloride, polyvinyl alcohol, fluorine-cortaining resin, chlorinated rubber, and ionomer resin; papers such as capacitor paper and paraffin paper; non-woven fabric; etc.. The substrate film 2 can also comprise a combination or laminate of the above-mentioned films.

The substrate film 2 may preferably have a thickness of 2 to 25 μm, while the thickness can appropriately be changed corresponding to the materials thereof so as to provide suitable strength and heat conductivity.

In the present invention, a heat-fusible ink layer comprising requisite materials is formed on the above-mentioned substrate film by the medium of a sensitizing layer.

The sensitizing layer may predominantly comprise a wax. Representative examples of the wax may include microcrystalline wax, carnauba wax, paraffin wax, etc.. In addition, specific examples of the wax may include: various species thereof such as Fischer-tropsch wax, various low-molecular weight polyethylene, Japan wax, beeswax, whale wax, insect wax, lanolin, shellac wax, candelilla wax, petrolactam, partially modified wax, fatty acid ester, and fatty acid amide. Among these, it is preferred to use those having a melt viscosity of 100 cps or lower, more preferably 50 cps or lower. If the melt viscosity is too high, it becomes similar to that of the ink layer and sensitizing function thereof becomes insufficient, whereby void is liable to occur. Such a sensitizing layer may preferably have a thickness of 0.1–2 μm, more preferably 0.5–1.5 μm. If the sensitizing layer is too thin, the sensitizing effect thereof becomes insufficient. If the sensitizing layer is too thick, the sensitivity is decreased.

The above-mentioned melt viscosity is regulated by a value measured by means of a viscometer (Rotovisco M-500, mfd by Haake Co.) using a sensor MV-1 and a shear rate of 256 (1/s).

In a case where the above-mentioned sensitizing layer is formed by a hot-melt coating method etc., in the same manner as in the prior art, it is difficult to form a layer having a uniform thickness since the layer is extremely thin. Accordingly, in the present invention, the sensitizing layer is formed by an emulsion method using an aqueous dispersion containing a wax. The sensitizing layer may preferably be formed by applying an aqueous dispersion of a wax onto a substrate film and drying the resultant coating at a temperature which is not higher than or not lower than the melting point of the wax.

The above-mentioned aqueous medium to be used in combination with the water or a mixture comprising water and a water-soluble organic solvent such as methanol, ethanol and isopropanol. When such a water-soluble organic solvent is used in an amount of 5–400 wt. parts per 100 wt. parts of water, the wettability of the aqueous wax dispersion to the substrate film is enhanced.

The above-mentioned aqueous wax dispersion can further contain a small amount of a known additive such as emulsifying agent (surfactant) and leveling agent. The solid content of such a dispersion may be about 10–50 wt.%.

The sensitizing layer comprising the above-mentioned wax may be formed by applying an ink composition containing the wax by a known coating method and then drying the resultant coating. When the drying is conducted at a temperature which is not lower than the melting point of the wax, there may be formed a sensitizing layer having surface smoothness. On the other hand, the drying is conducted at a temperature lower than the melting point of the wax, there may be formed a sensitizing layer having a surface with minute unevennesses wherein the particulate form of the dispersin is retained.

The above-mentioned sensitizing layer can further contain a pigment or dye having the same hue as that of an ink layer described hereinafter. In such an embodiment, the resultant image density (or printing density) is further improved.

The ink layer to be disposed on the sensitizing layer comprises a colorant and a vehicle. The ink layer can also contain an optional additive selected from various species thereof, as desired.

The colorant may preferably be one having a good recording property as a recording material, which is selected from organic or inorganic dyes or pigments. For example, the colorant may preferably be one having a sufficient coloring density (or coloring power) and is not substantially faded due to light, heat, temperature, etc.

As a matter of course, the colorant may generally have a black color, but may also have another color such as cyan, magenta and yellow.

In the present invention, since n-fold printing is effected by using an ink layer having a relatively small area, it is necessary to set a relatively high colorant concentration in the ink layer. The concentration can also vary depending on the thickness of the ink layer, but may preferably be 20–70 wt.%, more preferably 30–50 wt.% when the ink layer has a thickness in a preferred range of 3–20 μm. If the concentration is too low, the image density may be insufficient. If the concentration is too high, the wettability of the ink to paper is poor, and void is undesirably liable to occur.

When a black ink layer is formed as the ink layer, the ink layer comprises carbon black and a vehicle, and can also contain various additives, as desired.

The carbon black is required to have a specific surface area of 100 $m^2/g$ or above, (preferably 120 to 300 $m^2/g$), and oil absorption of 130 cc/100 g or below (preferably 50 to 130 cc/100 g). When the specific surface area is below 100 $m^2/g$, the coloring power of the carbon black is insufficient and it is difficult to obtain printed letters having a high image density. On the other hand, when the oil absorption exceeds 130 cc/100 g, the melt viscosity of the ink layer becomes too high and the resolution of the resultant image is lowered.

Commercially available example of carbon black to be used in the present invention having the above-mentioned properties may include: MA-600, MA100, MA 7, MA8, #40, #44, #900 #950 mfd. by Mitsubishi Kasei K. K., Morgal L, Morgal BPL, mfd. by Cabot Co., Printex 80, Printex 85, Printex 90 mfd. by Degusa Co., #8200, #8500, #7550 and #7700 mfd. by Tokai Carbon K. K.

The concentration of the carbon black in the ink layer may preferably be in the range of 20 to 30 wt.%. If the concentration is below the range, the resultant image density is insufficient. If the concentration exceeds the above range, the melt viscosity of the ink layer becomes too high. Further, the ink layer may preferably have a thickness of 3–20 μm. If the thickness is below the range, the resultant image density becomes insufficient. If the thickness exceeds the range, the printing sensitivity is lowered.

When a black dye such as nigrosine dye is used in a concentration of several wt. % based on the weight of the ink layer in combination with the carbon black, the resultant image density is not lowered and printed letter of jet-black color can be obtained, even when the carbon black concentration is lowered.

The vehicle may predominantly comprise a wax or may comprise a mixture of a wax and another component such as drying oil, resin, mineral oil, and derivatives of cellulose and rubber.

In the present invention, a lubricating agent or lubricant can be added to the ink layer. Specific example thereof may include lubricants having a lubricating property, such as wax, silicone wax, fluorine-containing resin, silicone resin, higher fatty acid amide, higher fatty acid ester, and surfactant. It is preferred to add such a lubricant in an amount of 0.2–5 wt. parts per 100 wt. parts of the ink layer. If the addition amount is below the above-mentioned range, the slip property between the substrate film and a transfer-receiving member due to heat accumulation at the time of printing is insufficient. If the addition amount is too large, the adhesion property between the ink layer and substrate film is undesirably decreased.

In the present invention, it is also possible to use a diurethane compound and a resin compatible with the diurethane compound, as a vehicle. The diurethane compound used herein is one represented by the following general formula:

$$R-O-\underset{\underset{O}{\|}}{C}-NH-(CH_2)_n-NH-\underset{\underset{O}{\|}}{C}-O-R$$

wherein R denotes an alkyl group having 1–5 carbon atoms, and n denotes an integer of 2–10. In the present invention, it is particularly preferred to use a diurethane compound having a melting point of 70°–90° C., wherein R is methyl, ethyl or propyl group, and n is 6.

It is known that the above mentioned compound is used as a binder of an ink layer, as disclosed in Japanese Laid-Open Patent Publication No. 82853/1982.

The compatible resin is a resin having a compatibility with the diurethane resin in the coating liquid for forming the ink layer in the presence of a solvent, or in a heat-melted state thereof at the time of coating operation in the absence of a solvent. Specific examples of the compatible resin may include: cellulose derivatives such as nitrocellulose, acetylcellulose, cellulose propionate, cellulose butyrate, cellulose acetate buthrate, and benzyl cellulose. In addition, it is also possible to use many resins used as a binder for known gravure ink, such as polyurethane resin, vinyl chloride/vinyl acetate copolymer, polyamide resin, polyester resin, and polyvinyl butyral resin.

According to our investigation, we have found that when the above-mentioned compatible resin is added to the above-mentioned diurethane compound and the resultant mixture is used for formation of an ink layer, these two components are compatible with each other at the time of ink layer formation so that a homogeneous or uniform ink layer is formed; and these components provide a dispersion state of a sort of island-sea structure in the ink layer after the formation of the ink layer, whereby the releasability of the ink layer comprising the diurethane compound is well controlled.

It is preferred to use the compatible resin in an amount of 40–250 wt. parts per 100 wt. parts of the diurethane compound. If the amount of the compatible resin is below the above range, it is difficult to control the release amount of the ink layer. If the amount exceeds the above range, the transfer of the ink layer per se becomes difficult.

In the present invention, it is also possible to add a small amount of a thermoplastic resin such as polyvinyl butyral resin and polyester resin to the above-mentioned binder so that transfer control property of the ink layer to a transfer-receiving material is improved. In addition, it is possible to add inorganic or organic filler such as silica, alumina, clay, and plastic pigment to the ink layer so that ground staining of a transfer receiving material may be prevented at the time of printing.

The ink comprising the colorant and the vehicle as described above may preferably be so constituted that the melt viscosity at 100° C. may be 1000 cps or higher. In a case where a melt viscosity of 1000 cps or higher cannot be obtained by using a wax alone, it is possible to use various thermoplastic resins such as vinyl-type resin in combination to enhance the cohesion thereof, so that the melt viscosity is improved. The melt viscosity may preferably be 1000–5000 cps at 100° C. If the melt viscosity is too low, ground staining or trailing becomes marked. If the melt viscosity is too high, void is liable to occur. The ground staining or trailing can also be suppressed by incorporating a lubricant as described hereinafter into the ink layer.

The melt viscosity of the ink used in such an embodiment is regulated by a value thereof measured by means of a viscometer (Rotovisco PK-100, mfd. by Haake Co.) using a sensor PK5°-0.5° (cone plate) and a shear rate of 512 (1/s). Accordingly, such a measurement means is different from the measurement means (Rotovisco M-500) for measuring the melt viscosity of the sensitizing layer described hereinabove. The melt viscosity of 1000 cps according to Rotovisco PK-100 corresponds to a melt viscosity of 300 cps according to Rotovisco M-500.

In order to form the above-mentioned sensitizing layer and ink layer, there may be used various method for applying a coating liquid such as hot-melt coating, hot-lacquer coating, gravure coating, gravure reverse coating, and roller coating.

In the present invention, it is preferred to form a colorless surface layer on the surface of the above-mentioned ink layer. The surface layer may be formed by using the above-mentioned wax, or vehicle (or medium) for the ink layer. In addition, it is preferred to form the surface layer by using a lubricant such as lubricating wax, silicone wax, fluorine-containing resin, silicone-type resin, higher fatty acid amide or ester, and surfactant or by using a thermoplastic resin in combination with such a lubricant so that the film strength thereof may be improved. Further, the surface layer can have a two-layer structure comprising a lubricant layer and a resin layer.

In the above-mentioned surface layer, it is preferred to form a minute linear unevenness shape having an angle of, e.g., 15°-60° with respect to the moving direction of the thermal transfer sheet. The minute unevenness shape may easily be formed by using a gravure plate having oblique grooves at the time of the surface layer formation. Particularly, when the surface layer is formed by applying an aqueous dispersion comprising a lubricant an vehicle and drying the resultant coating at a low temperature, a surface with minute unevenness shape retaining particulate shapes may be provided. In such an embodiment, the sticking of the thermal transfer sheet to a transfer-receiving material is prevented at the time of printing, and the thermal transfer sheet can be caused to have a further improved resistance to ground staining.

The surface layer may preferably have a melt viscosity of 2000-10000 cps at 150° C. If the melt viscosity is below 2000 cps, it may easily be removed due to friction with a transfer-receiving material so that ground staining of the transfer-receiving material is liable to occur. If the melt viscosity exceeds 10000 cps, the transferability of the ink layer becomes insufficient and white drop-outs are liable to occur. Such a melt viscosity may easily be controlled by changing the mixing ratio between the wax and thermoplastic resin.

The melt viscosity of the surface layer may be regulated on the basis of a value thereof measured by means of a viscometer (Rotovisco POK-100, mfd. by Haake Co.) using a sensor PK 5°-0.5° (cone plate) and a shear rate of 512 (1/s), in the same manner as in the case of the above-mentioned melt viscosity of the ink layer.

The surface layer may be formed by using various technique in the same manner as in the formation of the ink layer. The surface layer may preferably have a thickness of 0.1-5 μm so that the sensitivity does not become insufficient even when printing energy is decreased as in the case of a high-speed-type printer.

In the present invention, it is possible to form a sealing layer on the above-mentioned surface layer. The sealing layer has a function of filling the surface unevenness of rough paper and is required to be easily transferred to the paper surface due to friction between the thermal transfer sheet and the paper in an n-fold printing method. The sealing layer having such a function may preferably be formed by using a relatively soft or brittle wax selected from those described hereinabove. For example, such a wax may preferably have a melt viscosity of 20-100 cps at 100° C. If the melt viscosity is below the above range, it poses a problem in handling thereof such as blocking. If the melt viscosity exceeds the above range, the transferability of the sealing layer becomes insufficient. The sealing layer may preferably have a thickness of 1.0-6.0 μm. If the sealing layer is too thin, the sealing effect thereof becomes insufficient. If the sealing layer is too thick, the printing sensitivity is undesirably lowered.

The melt viscosity of the sealing layer is regulated on the basis of a value thereof measured by means of a viscometer (Rotovisco M-500, mfd. by Haake Co.) using a sensor MV-1 and a shear rate of 256 (1/s).

Figure 2:
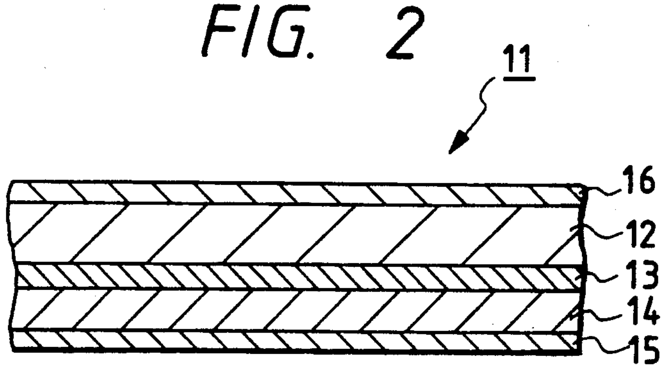
FIG. 2 is a schematic sectional view showing another embodiment of the thermal transfer sheet according to the present invention.

Referring to FIG. 2, the thermal transfer sheet according to the present invention may also comprise a substrate film 12, a sensitizing layer 13, an ink layer 14 and a surface layer 15, formed on one surface side of the substrate film 12, and a back coating layer 16 formed on the other surface side of the substrate film 12. The back coating layer 16 has a function of preventing sticking of a thermal head.

The above-mentioned back coating layer 16 may comprise a binder resin and an optional additive.

Specific examples of the binder resin may include: cellulose resins such as ethylcellulose, hydroxyethyl cellulose, ethy-hydroxy-ethylcellulose, hydroxypopyl cellulose, methylcellulose, cellulose acetate, cellulose acetate butyrate, and nitrocellulose; vinyl-type resins such as polyvinyl alcohol, polyvinyl accetate, polyvinyl butyral, polyvinyl acetal, polyvinyl pyrrolidone, acrylic resin, polyacrylamide, and acrylonitrile-styrene copolymer; polyester resin, poly-urethane resin, silicone-modified or fluorine-modified urethane resin, etc. Among these, it is preferred to use a resin having a somewhat reactivity (e.g., one having hydroxyl group, carboxyl group, or epoxy group) in combination with a crosslinking agent such as polyisocyanate so as to provide a crosslinked resin layer.

The back coating layer 16 may preferably comprise a binder resin predominantly comprising a styrene-acrylonitrile copolymer, and an optional additive.

The above-mentioned styrene-acrylonitrile copolymer used in the present invention may be obtained by co-polymerizing styrene and acrylonitrile. Such a copolymer may easily be prepared in an ordinary manner. In addition, any of commercially available products of various grades can be used in the present invention. Specific examples thereof may include those sold under the trade names of Sebian AD, Sebian LD, and Sebian NA (mfd. by Daiseru Kagaku K.K.).

Among styrene-acrylonitrile copolymers of various grades, it is preferred to use one having a molecular weight of $10\times10^4$ to $20\times10^4$ (more preferably $15\times10^4$ to $19\times10^4$), and/or an acrylonitile content of 20 to 40 mol % (more preferably 25 to 30 mol %). Such a copolymer may preferably have a softening temperature of 400° C. or higher according to differential thermal analysis, in view of heat resistance and dissolution stability to an organic solvent.

In a case where the substrate film 12 comprises a polyethylene terephthalate film, the adhesion property between the above-mentioned styrene-acrylonitrile copolymer and the substrate film 12 is not necessarily sufficient. Accordingly, in such a case, it is preferred to subject a monomer containing a small amount (e.g., several mol percent) of a functional group (such as methacrylic acid) to copolymerization, at the time of production of the styrene-acrylonitrile copolymer.

Alternatively, there may also be used a method of using a small amount of another adhesive resin in combination, or a method of preliminarily forming a primer layer on the substrate film by use of such an adhesive resin.

The adhesive resin may preferably comprise an amorphous linear saturated polyester resin having a glass transition point of 50° C. or higher. Example of such a polyester resin may include: those sold under trade names of Bairon (mfd. by Toyobo K.K.), Eriter (mfd. by Unitika K.K.), Polyester (mfd. by Nihon Gosei Kagaku K.K.). These resins of various grades are commercially available, and any of these resins can be used in the present invention.

Particularly preferred examples of such a resin may include Bairon RV 290 (mfd. by Toyobo K.K., product containing epoxy groups introduced thereinto, molecular weight $=2.0\times10^4$ to $2.5\times10^4$, Tg $=77°$ C., softening point $=180°$ C., hydroxyl value $=5$ to 8).

In a case where the above-mentioned polyester resin is used for forming a primer layer, it is preferred to form the primer layer having a thickness of about 0.05 to 0.5 μm. If the thickness is too small, the resultant adhesive property may be insufficient. If the thickness is too large, sensitivity to a thermal head or heat resistance may undesirably be lowered.

In a case where the adhesive resin (e.g., polyester resin) is used in a mixture with the above-mentioned styrene-acrylonitrile copolymer, the adhesive resin content may preferably be 1 to 30 wt. parts per 100 wt. parts of the styrene-acrylonitrile copolymer. If the adhesive resin content is too low, the resultant adhesive property may be insufficient. If the adhesive resin content is too high, the heat resistance of the back coating layer may be lowered, or sticking may be caused.

It is also possible to use a small amount of a binder resin in combination, specific examples of the binder resin may include: cellulose resins such as ethylcellulose, hydroxyethyl cellulose, ethyl-hydroxy-ethylcellulose, hydroxypropyl cellulose, methylcellulose, cellulose acetate, cellulose acetate butyrate, and nitrocellulose; vinyl-type resins such as polyvinyl alcohol, polyvinyl acetate, polyvinyl butyral, polyvinyl acetal, polyvinyl pyrrolidone, acrylic resin, polyacrylamide, and acrylonitrile-styrene copolymer; polyester resin, polyurethane resin, silicone-modified or fluorine-modified urethane resin, etc. When the back coating layer is formed by using the above-mentioned material, a thermal release agent or lubricating agent (or lubricant) may also be contained therein. Specific examples of such a release agent or lubricating agent may include wax, higher fatty acid amide, ester, surfactant, higher fatty acid metal salt, and alkylphosphate multi-valent metal salt.

Preferred examples of the lubricant may include an alkylphosphate (or alkylphosphoric acid ester) multi-valent metal salt. The alkylphosphate multi-valent metal salt may be obtained by replacing the alkali metal of an alkylphosphate alkali metal salt with a multi-valent metal, and the alkylphosphate multi-valent metal salt per se is known as an additive for plastic in the art. Such multi-valent metal salts of various grades are commercially available, and any of these multi-valent metal salts can be used in the present invention.

The alkylphosphate multi-valent metal salt may include those represented by the following formula:

$$[(RO)_2\overset{\overset{O}{\|}}{P}-O-]_nM,$$

and/or

-continued $$[(RO)\overset{\overset{O}{\|}}{P}(-O-)_2]_{n/2}M,$$

wherein R denotes an alkyl group having 12 or more carbon atoms such as cetyl, lauryl, and stearyl (particularly, stearyl); M denotes an alkaline earth metal such as barium, calcium and magnesium, and zinc, aluminum, etc.; and n denotes the valence of M.

It is preferred to use the above-mentioned alkylphosphate multi-valent metal salt in an amount of 10 to 150 wt. parts with respect to 100 wt. parts of the above-mentioned binder resin. If the amount of the multi-valent salt to be used is below the above range, sufficient slip property is difficult to be obtained. On the other hand, if the amount of the multi-valent salt exceeds the above range, the physical strength of the back coating layer may undesirably be lowered.

In order to improve the heat-resistance of the back coating layer, it is possible to incorporate a heat resistance-imparting agent thereinto. Specific examples of such an agent may include: Hydrotalsite DHT-4A (mfd. by Kyowa Kagaku Kogyo), Talcmicroace L-1 (mfd. by Nihon Talc), Taflon Rubron L-2 (mfd. by Daikin Kogyo), Fluorinated Graphite SCP-10 (mfd. by Sanpo Kagaku Kogyo), Graphite AT40S (mfd. by Oriental Sangyo), and fine particles such as silica, calcium carbonate, precipitated barium sulfate, crosslinked urea resin powder, crosslinked melamine resin powder, crosslinked styrene-acrylic resin powder, crosslinked amino resin powder, silicone resin powder, wood meal, molybdenum disulfide, and boron nitride.

Further, in order to impart an antistatic property to the back coating layer, it is possible to add thereto a conductivity-imparting agent such as carbon black.

The back coating layer may be formed by dissolving or dispersing the above-mentioned material in an appropriate solvent such as acetone, methyl ethyl ketone, toluene and xylene to prepare a coating liquid; and applying the coating liquid by an ordinary coating means such as gravure coater, roll coater, and wire bar; and drying the resultant coating.

The coating amount of the back coating layer, i.e., the thickness thereof, is also important. In the present invention, a back coating layer having sufficient performances may preferably be formed by using a coating amount of 0.5 $g/m^2$ or below, more preferably 0.1 to 0.5 $g/m^2$, based on the solid content thereof. If the back coating layer is too thick, the thermal sensitivity at the time of transfer operation may undesirably be lowered.

It is also effective to form a primer layer comprising a polyester resin or polyurethane resin, etc., on the substrate film, prior to the formation of the above-mentioned back coating layer.

The thermal transfer sheet can be in the form of sheet or leafs, but may generally be in the form of a roll obtained by winding the thermal transfer sheet around an appropriate core such as a paper tube. In this case, when an end detection mark is imparted to the back surface of the thermal transfer sheet near the joint portion thereof with the core material, it is possible that a sensor of a printer detects the mark and the printer is automatically stopped. The detection mark may suitably comprise a highly reflective mark obtained by printing using a silver or white ink, aluminum vapor deposition, aluminum foil attachment, etc.

As a matter of course, the present invention is applicable to a thermal transfer sheet for color printing. Accordingly, a multi-color thermal transfer sheet comprising a substrate and at least two color ink coating disposed thereon is also within the scope of the present invention.

The transfer-receiving material to be used in the present invention may comprise various papers, synthetic papers, plastic sheets, etc., but at least printing surface thereof is required to have a Bekk smoothness of 20–800 sec. The Bekk smoothness may arbitrarily be regulated by calendering, embossing, application of a coating liquid for surface treatment.

If the Bekk smoothness of the printing surface exceeds 800 sec., the thermal transfer sheet slips on the transfer-receiving material at the time of printing and the peeling of the ink layer becomes difficult, whereby it is difficult to obtain an image having a high image density. If the Bekk smoothness is below 20 sec., drop-out or lacking of printed letters is liable to occur, whereby the image quality is undesirably lowered.

Hereinbelow, the thermal transfer sheet according to the present invention is described in more detail with reference to Experimental Examples. In the description appearing hereinafter, "part(s)" and "%" are "part(s) by weight" and "wt. %", respectively, unless otherwise noted specifically.

In the description appearing hereinafter, the melt viscosity of a sensitizing layer is measured by means of a viscometer (Rotovisco M-500, mfd. by Haake Co.) using a sensor MV-1 and a shear rate of 256 (1/s), and the melt viscosity of an ink layer and a surface layer is measured by means of a viscometer (Rotovisco PK-100, mfd. by Haake Co.) using a sensor PK 5-0.5° (cone plate) and a shear rate of 512 (1/s).

EXAMPLE 1

Samples 1–15 were prepared in the following manner.

First, the following composition was mixed under stirring and subjected to dispersion treatment for three hours by means of a paint shaker, and an appropriate amount of a diluting solvent (MEK/toluene=1/1) was added to the resultant mixture thereby to prepare an ink for a back coating layer.

| Ink composition for back coating layer | |
|---|---|
| Styrene-acrylonitrile copolymer (Sebian AD, mfd. by Daiseru Kogyo K.K.) | 95 parts |
| Linear saturated polyester resin (Eriter UE 3200, mfd. by Unitika K.K.) | 5 parts |
| Zinc stearyl phosphate (LBT 1830, mfd. by Sakai Kagaku K.K.) | 10 parts |
| Solvent (MEK/toluene = 1/1) | 400 parts |

The above-mentioned ink was applied onto one surface side of a 6 μm-thick polyester film (Lumirror F-53, mfd. by Toray K.K.) by means of a wire bar coater so as to provide coating amounts of 0.5 $g/m^2$ (based on solid content), and then dried by using hot air, whereby a substrate film having the back coating layer was obtained.

SAMPLE 1

A coating liquid having the following composition was applied onto the surface of the above-mentioned substrate film having a back coating layer on the back surface thereof so as to provide a coating amount (after drying) of about 1.0 $g/m^2$ (a coating amount of 1.0 $g/m^2$ corresponds to a thickness of 1 μm, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, a composition comprising the following composition comprising the following components was heated up to 65° C. and applied onto the surface of the above-mentioned sensitizing layer by a hot-lacquer gravure coating method so as to provide a coating amount of 8 $g/m^2$, whereby a heat-transferable ink layer (melt viscosity=3000 cps at 100° C.) was formed.

| Ink composition for formation of transferable ink layer | |
|---|---|
| Carnauba wax | 20 parts |
| Ethylene-vinyl acetate copolymer (Sumitake KA-10, mfd. by Sumitomo Kagaku K.K.) | 13 parts |
| 150° F. paraffin wax | 45 parts |
| Carbon black (specific surface area = about 55 $m^2/g$, oil absorption = about 125 cc/100 g) | 30 parts |
| Nigrosine dye | 9 parts |
| Xylene | 50 parts |
| Isopropanol | 10 parts |

Thereafter, the following composition was heated up to 60° C., and was applied onto the above-mentioned ink layer by a hot lacquer gravure coating method so as to provide a coating amount of 2.0 $g/m^2$ and then dried to form thereon a surface layer, whereby a thermal transfer sheet (Sample 1) according to the present invention was obtained.

| Coating liquid composition for a surface layer | |
|---|---|
| Ethylene-vinyl acetate copolymer (Evaflex #460, mfd. by Mitsui Polychemical) | 40 parts |
| Carnauba wax | 20 parts |
| 150° F. paraffin wax | 50 parts |
| Xylene | 100 parts |
| Isopropanol | 10 parts |

SAMPLE 2

A coating liquid having the following composition was applied onto the surface of the same substrate film having a back coating layer on the back surface thereof as in Sample 1 so as to provide a coating amount (after drying) of about 1.0 $g/m^2$ (a coating amount of 1.0 $g/m^2$ corresponds to a thickness of 1 μm, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, a composition comprising the following composition comprising the following components was heated up to 100° C. and applied onto the surface of the above-mentioned sensitizing layer by a hot-melt roller coating method so as to provide a coating amount of 8 $g/m^2$, whereby a heat-transferable ink layer (melt viscosity=3000 cps at 100° C.) was formed.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 13 parts |
| 150° F. paraffin wax | 45 parts |
| Carbon black (specific surface area = about 55 $m^2/g$, oil absorption = about 125 cc/100 g) | 30 parts |
| Nigrosine dye | 9 parts |

Thereafter, the following composition was heated up to 60° C., and was applied onto the above-mentioned ink layer by a hot lacquer gravure coating method so as to provide a coating amount of 2.0 $g/m^2$ and then dried to form thereon a surface layer, whereby a thermal transfer sheet (Sample 2) according to the present invention was obtained.

| •Coating liquid composition for a surface layer | |
|---|---|
| Ethylene-vinyl acetate copolymer (Evaflex #460, mfd. by Mitsui Polychemical) | 40 parts |
| Carnauba wax | 20 parts |
| 150° F. paraffin wax | 50 parts |
| Xylene | 100 parts |
| Isopropanol | 10 parts |

SAMPLE 3

A thermal transfer sheet (Sample 3) according to the present invention was prepared in the same manner as in Sample 1 except that a sensitizing layer (thickness=1.0 $g/m^2$) was formed by using 150° F. paraffin wax (melt viscosity=5 cps at 100° C.) containing 5% of carbon black.

SAMPLE 4

A thermal transfer sheet (Sample 4) according to the present invention was prepared in the same manner as in Sample 1 except that a sensitizing layer (thickness=1.0 $g/m^2$) was formed by using the following wax composition (melt viscosity=80 cps at 100° C.).

| Coating liquid composition for a sensitizing layer | |
|---|---|
| Carnauba wax | 19 parts |
| Ethylene-vinyl acetate copolymer (Evaflex 210, mfd. by Mitsui Polychemical K.K.) | 1 part |
| Isopropanol | 60 parts |
| Water | 100 parts |

SAMPLE 5

A thermal transfer sheet (Sample 5) according to the present invention was prepared in the same manner as in Sample 1 except that a sensitizing layer (thickness=1.0 $g/m^2$) was formed by using the following wax composition (melt viscosity=50 cps at 100° C.).

| | |
|---|---|
| Carnauba wax | 19 parts |
| Ethylene-vinyl acetate copolymer (Evaflex 210, mfd. by Mitsui Polychemical K.K.) | 1 part |

-continued

| | |
|---|---|
| Isopropanol | 60 parts |
| Carbon black | 10 parts |
| Water | 100 parts |

SAMPLE 6

A thermal transfer sheet (Sample 6) according to the present invention was prepared in the same manner as in Sample 1 except that a sensitizing layer (thickness=1.5 $g/m^2$) was formed by using the following wax composition (melt viscosity=16 cps at 100° C.).

| Coating liquid composition for a sensitizing layer | |
|---|---|
| Candelilla wax | 30 parts |
| Surfactant for emulsion formation | 1 part |
| Isopropanol | 50 parts |
| Water | 50 parts |

SAMPLE 7

A thermal transfer sheet (Sample 7) according to the present invention was prepared in the same manner as in Sample 1 except that a heat-transferable ink layer (melt viscosity=4500 cps at 100° C.) was formed by heating the following composition up to 100° C. and applying the composition onto the surface of the same sensitizing layer as in Sample 1 by a hot-melt roller coating method so as to provide a coating amount of 8 $g/m^2$.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 20 parts |
| 150° F. paraffin wax | 45 parts |
| Carbon black (specific surface area = about 55 $m^2/g$, oil absorption = about 125 cc/100 g) | 30 parts |
| Oil Black | 5 parts |

SAMPLE 8

A thermal transfer sheet (Sample 8) according to the present invention was prepared in the same manner as in Sample 1 except that a heat-transferable ink layer (melt viscosity=2000 cps at 100° C.) was formed by heating the following composition up to 100° C. and applying the composition onto the surface of the same sensitizing layer as in Sample 1 by a hot-melt roller coating method so as to provide a coating amount of 8 $g/m^2$.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 10 parts |
| 150° F. paraffin wax | 45 parts |
| Carbon black (specific surface area = about 55 $m^2/g$, oil absorption = about 125 cc/100 g) | 25 parts |

SAMPLE 9

A thermal transfer sheet (Sample 9) according to the present invention was prepared in the same manner as in Sample 1 except that 5 parts of a synthetic wax was added to each of the compositions for the ink layer and surface layer, respectively.

SAMPLE 10

A thermal transfer sheet (Sample 10) according to the present invention was prepared in the same manner as in Sample 2 except that a heat-transferable ink layer (melt viscosity=1700 cps at 100° C.) was formed by heating the following composition up to 100° C. and applying the surface of the same sensitizing layer as in Sample 2 by a hot-melt roller coating method so as to provide a coating amount of 8 g/m$^2$.

| Ink composition for formation of a transferable ink layer | |
|---|---|
| Carnauba wax | 20 parts |
| Ethylene-vinyl acetate copolymer (Sumitate K0-10 mfd. by Sumitomo Kagaku K.K.) | 13 parts |
| 150° F. paraffin wax | 45 parts |
| Carbon black (MA-600, mfd. by Mitsubishi Kasei, specific surface area = about 150 m$^2$/g, oil absorption = about 125 cc/100 g) | 30 parts |

SAMPLE 11

A thermal transfer sheet (Sample 11) according to the present invention was prepared in the same manner as in Sample 10 except that 30 parts of #8200 mfd. by Tokai Carbon (specific surface area=about 160 m$^2$/g, oil absorption=about 65 cc/100 g) was used as carbon black.

SAMPLE 12

A thermal transfer sheet (Sample 12) according to the present invention was prepared in the same manner as in Sample 10 except that 25 parts of Printex 80 mfd. by Degussa Co. (specific surface area=about 220 m$^2$/g, oil absorption=about 100 cc/100 g) was used as carbon black so as to provide an ink layer having a thickness of 6 g/m$^2$.

SAMPLE 13

A thermal transfer sheet (Sample 13) according to the present invention was prepared in the same manner as in Sample 10 except that 22 parts of #900 mfd. by Mitsubishi Kasei (specific surface area=about 150 m$^2$/g, oil absorption=about 55 cc/100 g) was used as carbon black so as to provide an ink layer having a thickness of 6 g/m$^2$.

SAMPLE 14

A coating liquid having the following composition was applied onto the surface of the same substrate film having a back coating layer on the back surface thereof as in Sample 1 so as to provide a coating amount (after drying) of about 1.0 g/m$^2$ (a coating amount of 1.0 g/m$^2$ corresponds to a thickness of 1 μm, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, a composition comprising the following composition comprising the following components was heated up to 65° C. and applied onto the surface of the above-mentioned sensitizing layer by a hot-lacquer gravure coating method so as to provide a coating amount of 8 g/m$^2$, and then dried to form thereon a heat-transferable ink layer (melt viscosity=3000 cps at 100° C.), whereby a thermal transfer sheet (Sample 14) according to the present invention was obtained.

| Ink composition for formation of a transferable ink layer | |
|---|---|
| Carnauba wax | 20 parts |
| Ethylene-vinyl acetate oopolymer (Sumitake KA-10, mfd. by Sumitomo Kagaku K.K.) | 13 parts |
| 150° F. paraffin wax | 45 parts |
| Carbon black (specific surface area = about 55 m$^2$/g, oil absorption = about 125 cc/100 g) | 30 parts |
| Nigrosine dye | 9 parts |
| Xylene | 50 parts |
| Isopropanol | 10 parts |

SAMPLE 15

A coating liquid having the following composition was applied onto the surface of the same substrate film having a back coating layer on the back surface thereof as in Sample 1 so as to provide a coating amount (after drying) of about 1.0 g/m$^2$ (a coating amount of 1.0 g/m$^2$ corresponds to a thickness of 1 μm, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, a composition comprising the following composition comprising the following components was heated up to 100° C. and applied onto the surface of the above-mentioned sensitizing layer by a hot-melt roller coating method so as to provide a coating amount of 8 g/m$^2$ and then dried to form thereon a heat-transferable ink layer (melt viscosity=3000 cps at 100° C.), whereby a thermal transfer sheet (Sample 15) according to the present invention was obtained.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 13 parts |
| 150° F. paraffin wax | 45 parts |
| Carbon black (specific surface area = about 55 m$^2$/g, oil absorption = about 125 cc/100 g) | 30 parts |
| Nigrosine dye | 9 parts |

SAMPLE 16

A thermal transfer sheet (Sample 16) according to the present invention was prepared in the same manner as in Sample 14 except that a sensitizing layer (thickness=1.0 g/$m^2$) was formed by using 150° F. paraffin wax (melt viscosity=5 cps at 100° C.) containing 5% of carbon black.

SAMPLE 17

A thermal transfer sheet (Sample 17) according to the present invention was prepared in the same manner as in Sample 14 except that a sensitizing layer (thickness=1.0 g/$m^2$) was formed by using the following wax composition (melt viscosity=80 cps at 100° C.).

| Coating liquid composition for a sensitizing layer | |
|---|---|
| Carnauba wax | 19 parts |
| Ethylene-vinyl acetate copolymer (Evaflex 210, mfd. by Mitsui Polychemical K.K.) | 1 part |
| Isopropanol | 60 parts |
| Water | 100 parts |

SAMPLE 18

A thermal transfer sheet (Sample 18) according to the present invention was prepared in the same manmer as in Sample 14 except that a sensitizing layer (thickness=0.1 g/$m^2$) was formed by using the following wax composition (melt viscosity=50 cps at 100° C.).

| | |
|---|---|
| Carnauba wax | 19 parts |
| Ethylene-vinyl acetate copolymer (Evaflex 210, mfd. by Mitsui Polychemical K.K.) | 1 part |
| Isopropanol | 60 parts |
| Carbon black | 10 parts |
| Water | 100 parts |

SAMPLE 19

A thermal transfer sheet (Sample 19) according to the present invention was prepared in the same manner as in Sample 14 except that a sensitizing layer (thickness=1.5 g/$m^2$) was formed by using the following wax composition (melt viscosity=16 cps at 100° C.).

| Coating liquid composition for a sensitizing layer | |
|---|---|
| Candelilla wax | 30 parts |
| Surfactant for emulsion formation | 1 part |
| Isopropanol | 50 parts |
| Water | 50 parts |

SAMPLE 20

A thermal transfer sheet (Sample 20) according to the present invention was prepared in the same manner as in Sample 14 except that a heat-transferable ink layer (melt viscosity=4500 cps at 100° C.) was formed by heating the following composition up to 100° C. and applying the composition onto the surface of the same sensitizing layer as in Sample 1 by a hot-melt roller coating method so as to provide a coating amount of 8 g/$m^2$.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 20 parts |
| 150° F. paraffin wax | 45 parts |
| Carbon black (specific surface area = about 55 $m^2$/g, oil absorption = about 125 cc/100 g) | 30 parts |
| Oil Black | 5 parts |

SAMPLE 21

A thermal transfer sheet (Sample 21) according to the present invention was prepared in the same manner as in Sample 14 except that a heat-transferable ink layer (melt viscosity=2000 cps at 100° C.) was formed by heating the following composition up to 100° C. and applying the composition onto the surface of the same sensitizing layer as in Sample 1 by a hot-melt roller coating method so as to provide a coating amount of 8 g/$m^2$.

| Ink composition for formation of a transferable ink layer | |
|---|---|
| Carnauba wax | 20 parts |
| Ethylene-vinyl acetate copolymer (Sumitate KA-10 mfd. by Sumitomo Kagaku K.K.) | 10 parts |
| 150° F. paraffin wax | 45 parts |
| Carbon black (specific surface area = about 55 $m^2$/g, oil absorption = about 125 cc/100 g) | 25 parts |

SAMPLE 22

A thermal transfer sheet (Sample 22) according to the present invention was prepared in the same manner as in Sample 14 except that 5 parts of a synthetic wax was added to the composition for the ink layer.

SAMPLE 23

A thermal transfer sheet (Comparative Sample 23) was prepared in the same manner as in Sample 1 except that the sensitivity layer and surface layer were not formed.

SAMPLE 24

A thermal transfer sheet (Comparative Sample 24) was prepared in the same manner as in Sample 1 except that the sensitivity layer was not formed.

Each of the Samples as prepared above was subjected to printing by using an evaluation an machine for N-fold recording mode (N=6) and the thus obtained results were compared with each other as shown in the following Table 1. The recording paper used herein was TRW1 (mfd. by Jujo Seishi K.K.).

TABLE 1

| | Ground staining | Trailing | Void | Resolution |
|---|---|---|---|---|
| Sample-1 | ○ | ○ | ○ | ○ |
| Sample-2 | ○ | ○ | ○ | ○ |
| Sample-3 | ○ | ○ | ○ | ○ |
| Sample-4 | ○ | ○ | ○ | ○ |
| Sample-5 | ○ | ○ | ○ | ○ |
| Sample-6 | ○ | ○ | ○ | ○ |
| Sample-7 | ○ | ○ | ○ | ○ |
| Sample-8 | ○ | ○ | ○ | ○ |
| Sample-9 | ○ | ○ | ○ | ○ |
| Sample-10 | ○ | ○ | ⊙ | ○ |

TABLE 1-continued

| | Ground staining | Trailing | Void | Resolution |
|---|---|---|---|---|
| Sample-11 | ○ | ○ | ◎ | ○ |
| Sample-12 | ○ | ○ | ◎ | ○ |
| Sample-13 | ○ | ○ | ◎ | ○ |
| Sample-14 | X | X | ○ | ○ |
| Sample-15 | X | X | ○ | ○ |
| Sample-16 | X | X | ○ | ○ |
| Sample-17 | X | X | ○ | ○ |
| Sample-18 | X | X | ○ | ○ |
| Sample-19 | X | X | ○ | ○ |
| Sample-20 | X | X | ○ | ○ |
| Sample-21 | X | X | ○ | ○ |
| Sample-22 | X | X | ○ | ○ |
| Sample-23 | X | X | X | Δ |
| Sample-24 | ○ | Δ | X | Δ |

◎: Excellent
○: Good
Δ: Somewhat good
X: Not good

EXAMPLE 2

Samples 1-13 were prepared in the following manner.

SAMPLE 1

An ink composition comprising the following components was heated up to 65° C. and applied onto the surface of the same substrate film having a back coating layer on the back surface thereof as in Sample 1 of Example 1 by a hot-lacquer gravure coating method so as to provide a coating amount of 8 $g/m^2$, whereby a heat-transferable ink layer (melt viscosity=3000 cps at 100° C.) was formed.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 13 parts |
| 150° F. paraffin wax | 45 parts |
| Carbon black | 30 parts |
| Nigrosine dye | 9 parts |
| Xylene | 50 parts |
| Isopropanol | 10 parts |

Thereafter, the following composition was applied onto the above-mentioned ink layer so as to provide a coating amount of 1.0 $g/m^2$ (based on solid content) and then dried to form thereon a surface layer (melt viscosity=2500 cps at 150° C.), whereby a thermal transfer sheet (Sample 1) according to the present invention was obtained.

| Coating liquid composition for a surface layer | |
|---|---|
| Carnauba wax | 10 parts |
| Polyethylene wax | 20 parts |
| Nonionic surfactant | 1 part |
| Isopropanol | 100 parts |
| Water | 30 parts |

SAMPLE 2

A coating liquid having the following composition was applied onto the surface of the same substrate film having a back coating layer on the back surface thereof as in Sample 1 of Example 1 so as to provide a coating amount (after drying) to about 1.0 $g/m^2$ (a coating amount of 1.0 $g/m^2$ corresponds to a thickness of 1 $\mu m$, in the same manner as in the description appearing hereinafter), whereby a sensitizing layer (melt viscosity=28 cps at 100° C.) was formed.

| Coating liquid composition for a surface layer | |
|---|---|
| Carnauba wax | 30 parts |
| Nonionic surfactant | 1 part |
| Isopropanol | 100 parts |
| Water | 30 parts |

Then, a composition comprising the following components was heated up to 65° C. and applied onto the surface of the above-mentioned sensitizing layer by a hot-lacquer gravure coating method so as to provide a coating amount of 8 $g/m^2$, whereby a heat-transferable ink layer (melt viscosity=3000 cps at 100° C.) was formed.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 13 parts |
| 150° F. paraffin wax | 45 parts |
| Carbon black | 30 parts |
| Nigrosine dye | 9 parts |
| Xylene | 50 parts |
| Isopropanol | 10 parts |

Thereafter, the following composition was applied onto the above-mentioned so as to provide a coating amount of 1.0 $g/m^2$ and then dried to form thereon a surface layer (melt viscosity=2500 cps at 150° C.), whereby a thermal transfer sheet (Sample 2) according to the present invention was obtained.

| Coating liquid composition for surface layer | |
|---|---|
| Carnauba wax | 10 parts |
| Polyethylene wax (m.p.= 140° C.) | 20 parts |
| Nonionic surfactant | 1 part |
| Isopropanol | 100 parts |
| Water | 30 parts |

SAMPLE 3

A coating liquid-having the following composition was heated up to 100° C. and was applied onto the surface of the same substrate film having a back coating layer on the back surface thereof as in Sample 1 of Example 1 by a hot-melt roller coating method so as to provide a coating amount of 8 $g/m^2$, whereby a heat-transferable ink layer (melt viscosity=3000 cps at 100° C.) was formed.

| Ink composition for formation of a transferable ink layer | |
|---|---|
| Carnauba wax | 20 parts |
| Ethylene-vinyl acetate copolymer (Evaflex, KA-10, mfd. by Mitsui Polychemical K.K.) | 13 parts |
| 150° F. paraffin wax | 45 parts |
| Carbon black | 30 part |
| Nigrosine dye | 9 parts |

Thereafter, the following composition was heated up to 60° C., and was applied onto the above-mentioned ink layer by a hot lacquer gravure coating method so as to provide a coating amount of 2.0 $g/m^2$ and then dried to form thereon a surface layer, whereby a thermal transfer sheet (Sample 3) according to the present invention was obtained.

| Coating liquid composition for a surface layer | |
|---|---|
| Ethylene-vinyl acetate copolymer (Evaflex, #460, mfd. by Mitsui Polychemical K.K.) | 40 parts |
| Carnauba wax | 20 parts |
| 150° F. paraffin wax | 50 parts |
| Xylene | 100 parts |
| Isopropanol | 10 parts |

SAMPLE 4

A coating liquid having the following composition was applied onto the surface of the same substrate film having a back coating layer on the back surface thereof as in Sample 1 of Example 1 so as to provide a coating amount (after drying) to about 1.0 $g/m^2$ (a coating amount of 1.0 $g/m^2$ corresponds to a thickness of 1 $\mu m$, in the same manner as in the description appearing hereinafter), whereby a sensitizing layer (melt viscosity=28 cps at 100° C.) was formed.

| Coating liquid composition for a surface layer | |
|---|---|
| Carnauba wax | 30 parts |
| Nonionic surfactant | 1 part |
| Isopropanol | 100 parts |
| Water | 30 parts |

Then, a heat-transferable ink layer and a surface layer were formed in the same manner as in Sample 3, whereby a thermal transfer sheet (Sample 4) according to the present invention was obtained.

SAMPLE 5

A thermal transfer sheet (Sample 5) according to the present invention was prepared in the same manner as in Sample 2 except that a sensitizing layer (thickness =1.0 $g/m^2$) was formed by using 150° F. paraffin wax (melt viscosity=5 cps at 100° C.) containing 5% of carbon black.

SAMPLE 6

A thermal transfer sheet (Sample 6) according to the present invention was prepared in the same manner as in Sample 2 except that a sensitizing layer (thickness=1.0 $g/m^2$) was formed by using the following wax composition (melt viscosity=80 cps at 100° C.).

| Coating liquid composition for a surface layer | |
|---|---|
| Carnauba wax | 19 parts |
| Ethylene-vinyl acetate copolymer (Evaflex, 210, mfd. by Mitsui Polychemical K.K.) | 1 part |
| Isopropanol | 60 parts |
| Water | 100 parts |

SAMPLE 7

A thermal transfer sheet (Sample 7) according to the present invention was prepared in the same manner as in Sample 2 except that a sensitizing layer (thickness=1.0 $g/m^2$) was formed by using the following wax composition (melt viscosity=50 cps at 100° C.).

| Coating liquid composition for a surface layer | |
|---|---|
| Carnauba wax | 19 parts |
| Ethylene-vinyl acetate copolymer (Evaflex, 210, mfd. by Mitsui Polychemical K.K.) | 0.5 part |
| Isopropanol | 60 parts |
| Carbon black | 10 parts |
| Water | 100 parts |

SAMPLE 8

A thermal transfer sheet (Sample 8) according to the present invention was prepared in the same manner as in Sample 2 except that a sensitizing layer (thickness=1.0 $g/m^2$) was formed by using the following wax composition (melt viscosity=16 cps at 100° C.).

| Coating liquid composition for a surface layer | |
|---|---|
| Candelilla wax | 30 parts |
| Surfactant for emulsion formation | 1 part |
| Isopropanol | 50 parts |
| Water | 50 parts |

SAMPLE 9

A thermal transfer sheet (Sample 9) according to the present invention was prepared in the same manner as in Sample 2 except that a heat-transferable ink layer (melt viscosity=4500 cps at 100° C.) was formed by heating the following composition up to 100° C. and applying the composition onto the surface of the same sensitizing layer as in Sample 2 by a hot-melt roller coating method so as to provide a coating amount of 8 $g/m^2$.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 20 parts |
| 150° F. paraffin wax | 45 parts |
| Carbon black | 30 parts |
| Oil black | 5 parts |

SAMPLE 10

A thermal transfer sheet (Sample 10) according to the present invention was prepared in the same manner as in Sample 2 except that a heat-transferable ink layer (melt viscosity=2000 cps at 100° C.) was formed by heating the following composition up to 100° C. and applying the composition onto the surface of the same sensitizing layer as in Sample 2 by a hot-melt roller coating method so as to provide a coating amount of 8 $g/m^2$.

| Ink oomposition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 10 parts |
| 150° F. paraffin wax | 45 parts |
| Carbon black | 25 parts |

SAMPLE 11

A thermal transfer sheet (Sample 11) according to the present invention was prepared in the same manner as in Sample 1 except that 5 parts of a synthetic wax was added to each of the compositions for the ink layer and surface layer, respectively.

SAMPLE 12

A thermal transfer sheet (Sample 12) according to the present invention was prepared in the same manner as in Sample 2 except that 5 parts of a synthetic wax was added to each of the compositions for the ink layer and surface layer, respectively.

SAMPLE 13

A thermal transfer sheet (Comparative Sample 13) was prepared in the same manner as in Sample 1 except that the sensitizing layer was not formed.

Each of the Samples as prepared above was subjected to printing by using an evaluation machine for N-fold recording mode (N=6) and the thus obtained results were compared with each other as shown in the following Table 2. The recording paper used herein wax TRW1 (mfd. by Jujo Seishi K.K.).

TABLE 2

| | Ground staining | Trailing | Void | Resolution |
|---|---|---|---|---|
| Sample-1 | ○ | ○ | ○ | ○ |
| Sample-2 | ○ | ○ | ○ | ○ |
| Sample-3 | ○ | ○ | ○ | ○ |
| Sample-4 | ○ | ○ | ○ | ○ |
| Sample-5 | ○ | ○ | ○ | ○ |
| Sample-6 | ○ | ○ | ○ | ○ |
| Sample-7 | ○ | ○ | ○ | ○ |
| Sample-8 | ○ | ○ | ○ | ○ |
| Sample-9 | ○ | ○ | ○ | ○ |
| Sample-10 | ○ | ○ | ○ | ○ |
| Sample-11 | ○ | ○ | ○ | ○ |
| Sample-12 | ○ | ○ | ○ | ○ |
| Sample-13 | X | X | X | Δ |

○: Good
Δ: Somewhat bad
X: Bad

EXAMPLE 3

Samples 1-10 were prepared in the following manner.

SAMPLE 1

A coating liquid having the following composition was applied onto the surface of the same substrate film having a back coating layer on the back surface thereof as in Sample 1 of Example 1 so as to provide a coating amount (after drying) of about 1.0 $g/m^2$ (a coating amount of 1.0 $g/m^2$ corresponds to a thickness of 1 μm in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, a composition comprising the following components was heated up to 100° C. and applied onto the surface of the above-mentioned sensitizing layer by a hot-melt roller coating method so as to provide a coating amount of 8 $g/m^2$, whereby a heat-transferable ink layer (melt viscosity=1700 cps at 100° C.) was formed.

| Ink composition for formation of a transferable ink layer | |
|---|---|
| Carnauba wax | 20 parts |
| Ethylene-vinyl acetate copolymer (Sumitate KC-10, mfd. by Sumitomo Kagaku K.K.) | 13 parts |
| 150° F. paraffin wax | 45 parts |
| Carbon black | 35 parts |

Thereafter, the following composition was heated up to 60° C., and was applied onto the above-mentioned ink layer by a hot lacquer gravure coating method so as to provide a coating amount of 2.0 $g/m^2$ and then dried to form thereon a surface layer, whereby a thermal transfer sheet (Sample 1) according to the present invention was obtained.

| Coating liquid composition for a surface layer | |
|---|---|
| Ethylene-vinyl acetate copolymer (Sumitate KC-10, mfd, by Sumitomo Kagaku K.K.) | 40 parts |
| Carnauba wax | 20 parts |
| 150° F. paraffin wax | 50 parts |
| Xylene | 100 parts |
| Isopropanol | 10 parts |

SAMPLE 2

A thermal transfer sheet (Sample 2) according to the present invention was prepared in the same manner as in Sample 1 except that a sensitizing layer (thickness=1.0 $g/m^2$) was formed by using 150° F. paraffin wax (melt viscosity=5 cps at 100° C.).

SAMPLE 3

A thermal transfer sheet (Sample 3) according to the present invention was prepared in the same manner as in Sample 1 except that a sensitizing layer (thickness=1.0 $g/m^2$) was formed by using the following wax composition (melt viscosity=80 cps at 100° C.).

| Coating liquid composition for a sensitizing layer | |
|---|---|
| Carnauba wax | 19 parts |
| Vinyl chloride-vinyl acetate copolymer (Evaflex 210, mfd. by Mitsui Polychemical K.K.) | 1 part |
| Isopropanol | 60 parts |
| Water | 100 parts |

SAMPLE 4

A thermal transfer sheet (Sample 4) according to the present invention was prepared in the same manner as in Sample 1 except that a sensitizing layer (thickness=1.0 $g/m^2$) was formed by using the following wax composition (melt viscocity=50 cps at 100° C.)

| Coating liquid composition for a sensitizing layer | |
|---|---|
| Carnauba wax | 19 parts |
| Vinyl chloride-vinyl acetate copolymer (Evaflex 210, mfd. by Mitsui polychemical K.K.) | 0.5 part |
| Isopropanol | 60 parts |
| Water | 100 parts |

SAMPLE 5

A thermal transfer sheet (Sample 5) according to the present invention was prepared in the same manner as in Sample 1 except that a sensitizing layer (thickness=1.5 $g/m^2$) was formed by using the following wax composition (melt viscosity=16 cps at 100° C.).

| Coating liquid composition for a sensitizing layer | |
|---|---|
| Candelilla wax | 30 parts |
| Surfactant for emulsion formation | 1 part |
| Isopropanol | 50 parts |
| Water | 50 parts |

SAMPLE 6

A thermal transfer sheet (Sample 6) according to the present invention was prepared in the same manner as in Sample 1 except that a heat-transferable ink layer (melt viscosity=2700 cps at 100° C.) was formed by heating the following composition up to 100° C. and applying the composition onto the surface of the same sensitizing layer as in Sample 1 by a hot-melt roller coating method so as to provide a coating amount of 8 $g/m^2$.

| Ink composition for formation of a transferable ink layer | |
|---|---|
| Carnauba wax | 20 parts |
| Ethylene-vinyl acetate copolymer Sumitate KC-10, mfd, by Sumitomo Kagaku K.K.) | 20 parts |
| 150° F. paraffin wax | 45 parts |
| Carbon black | 35 parts |

SAMPLE 7

A thermal transfer sheet (Sample 7) according to the present invention was prepared in the same manner as in Sample 1 except that a heat-transferable ink layer (melt viscosity=1300 cps at 100° C.) was formed by heating the following composition up to 100° C. and applying the composition onto the surface of the same sensitizing layer as in Sample 1 by a hot-melt roller coating method so as to provide a coating amount of 8 $g/m^2$.

| Ink composition for formation of a transferable ink layer | |
|---|---|
| Carnauba wax | 20 parts |
| Ethylene-vinyl acetate copolymer (Sumitate KC-10, mfd, by Sumitomo Kagaku K.K.) | 10 parts |
| 150° F. paraffin wax | 45 parts |
| Carbon black | 25 parts |

SAMPLE 8

A thermal transfer sheet (Comparative Sample 8) was prepared in the same manner as in Sample 1 except that the sensitizing layer and surface layer were not formed.

SAMPLE 9

A thermal transfer sheet (Comparative Sample 9) was prepared in the same manner as in Sample 1 except that the sensitizing layer was not formed.

SAMPLE 10

A thermal transfer sheet (Comparative Sample 10) was prepared in the same manner as in Sample 3 except that 5 parts of the vinyl chloride-vinyl acetate copolymer was used instead of 1 part thereof so as to provide a melt viscosity of 1000 cps at 100° C.

Each of the Samples as prepared above was subjected to printing by using an evaluation machine for N-fold recording mode (N=6) and the thus obtained results were compared with each other as shown in the following Table 3. The recording paper used herein was TRW1 (mfd. by Jujo Seishi K.K.).

TABLE 3

| | Ground staining | Trailing | Void | Resolution |
|---|---|---|---|---|
| Sample-1 | ○ | ○ | ○ | ○ |
| Sample-2 | ○ | ○ | ○ | ○ |
| Sample-3 | ○ | ○ | ○ | ○ |
| Sample-4 | ○ | ○ | ○ | ○ |
| Sample-5 | ○ | ○ | ○ | ○ |
| Sample-6 | ○ | ○ | ○ | ○ |
| Sample-7 | ○ | ○ | ○ | ○ |
| Sample-8 | X | X | X | Δ |
| Sample-9 | ○ | Δ | X | Δ |
| Sample-10 | ○ | Δ | X | Δ |

○: Good
Δ: Somewhat bad
X: Bad

EXAMPLE 4

Samples 1–4 were prepared in the following manner.

SAMPLE 1

A coating liquid having the following composition was applied onto the surface of the same substrate film having a back coating layer on the back surface thereof as in Sample 1 of Example 1 so as to provide a coating amount (after drying) of about 0.6 $g/m^2$ and then dried at 80°–90° C., whereby a sensitizing layer (melt viscosity=28 cps at 100° C.) was formed.

| Coating liquid composition for sensitizing layer | |
|---|---|
| Carnauba wax | 30 parts |
| Nonionic surfactant | 1 part |
| Isopropanol | 100 parts |
| Water | 30 parts |

Then, a composition comprising the following components was melt-kneaded by means of an attritor for 6 hours while being heated at 120° C., thereby to prepare a transferable ink composition.

| Ink composition for formation of a transferable ink layer | |
|---|---|
| Ethylene-vinyl acetate copolymer | 13 parts |
| Carnauba wax | 20 parts |
| Paraffin wax | 45 parts |
| Lubricant (silicone wax) | 2 parts |
| Carbon black | 35 parts |

The above-mentioned ink composition was heated up to 120° C. and applied onto the surface of the above-mentioned sensitizing layer by a hot-melt roller coating method so as to provide a coating amount of 8 $g/m^2$, whereby a heat-transferable ink layer (melt viscosity=3000 cps at 100° C.) was formed.

Thereafter, the following composition was applied onto the surface of the above-mentioned ink layer so as to provide a coating amount of 2.0 $g/m^2$ (based on solid content) and then dried to form thereon a surface layer, whereby a thermal transfer sheet (Sample 1) according to the present invention was obtained.

| Coating liquid composition for a surface layer | |
|---|---|
| Carnauba wax | 20 parts |
| Ethylene-vinyl acetate copolymer | 40 parts |
| Paraffin wax | 50 parts |
| Isopropanol | 10 parts |
| Xylene | 100 parts |

SAMPLE 2

A thermal transfer sheet (Sample 2) according to the present invention was prepared in the same manner as in Sample 1 except that a heat-transferable ink layer (melt viscosity=2000 cps at 100° C.) was formed by using the following coating liquid.

| Ink composition for formation of a transferable ink layer | |
|---|---|
| Ethylene-vinyl acetate copolymer | 13 parts |
| Carnauba wax | 20 parts |
| Paraffin wax | 45 parts |
| Lubricant (higher fatty acid amide) | 5 parts |
| Carbon black | 35 parts |

SAMPLE 3

A thermal transfer sheet (Sample 3) according to the present invention was prepared in the same manner as in Sample 1 except that a heat-transferable ink layer (melt viscosity=2000 cps at 100° C.) was formed by using the following coating liquid.

| Ink composition for formation of a transferable ink layer | |
|---|---|
| Ethylene-vinyl acetate copolymer | 13 parts |
| Carnauba wax | 20 parts |
| Paraffin wax | 45 parts |
| Lubricant (polyethylene glycol) | 5 parts |
| Carbon black | 35 parts |

SAMPLE 4

A thermal transfer sheet (Comparative Sample 4) was prepared in the same manner as in Sample 1 except that no lubricant was added to the ink layer, and the sensitizing layer and surface layer were not formed.

Each of the Samples as prepared above was subjected to printing by using an evaluation machine by N-fold recording mode (N=6) and the thus obtained results were compared with each other as shown in the following Table 4. The recording paper used herein was TRW1 (mfd. by Jujo Seishi K.K.).

TABLE 4

| | Ground staining | Trailing | Void | Resolution |
|---|---|---|---|---|
| Sample-1 | ○ | ○ | ○ | ○ |
| Sample-2 | ○ | ○ | ○ | ○ |
| Sample-3 | ○ | ○ | ○ | ○ |
| Sample-4 | X | X | X | Δ |

○: Good
Δ: Somewhat bad
X: Bad

EXAMPLE 5

Samples 1-10 were prepared in the following manner.

(Sample 1)

A coating liquid having the following composition was applied onto the surface of the same substrate film having a back coating layer on the back surface thereof as in Sample 1 of Example 1 so as to provide a coating amount (after drying) of about 1.0 $g/m^2$ (a coating amount of 1.0 $g/m^2$ corresponds to a thickness of 1 $\mu m$, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, a composition comprising the following components was heated up to 100° C. and applied onto the surface of the above-mentioned sensitizing layer by a hot-melt roller coating method so as to provide a coating amount of 8 $g/m^2$, whereby a heat-transferable ink layer (melt viscosity=1700 cps at 100° C.) was formed.

| Ink composition for formation of a transferable ink layer | |
|---|---|
| Carnauba wax | 20 parts |
| Ethylene-vinyl acetate copolymer (Sumitate KC-10, mfd, by Sumitomo Kagaku K.K.) | 13 parts |
| 150° F. paraffin wax | 45 parts |
| Carbon black | 35 parts |

Thereafter, the following composition was heated up to 60° C., and was applied onto the above-mentioned ink layer by a hot lacquer gravure coating method so as to provide a coating amount of 2.0 $g/m^2$ and then dried to form thereon a surface layer.

| Coating liquid composition for a surface layer | |
|---|---|
| Ethylene-vinyl acetate copolymer (Sumitate 460, mfd. by Sumitomo Kagaku K.K.) | 40 parts |
| Carnauba wax | 20 parts |
| 150° F. paraffin wax | 50 parts |
| Xylene | 100 parts |
| Isopropanol | 10 parts |

Thereafter, the following composition was heated up to 60° C., and was applied onto the above-mentioned surface layer by a hot lacquer gravure coating method so as to provide a coating amount of 3.0 $g/m^2$ and then dried to form thereon a sealing layer, whereby a thermal transfer sheet (Sample 1) according to the present invention was obtained.

| Coating liquid composition for a sealing layer | |
|---|---|
| Paraffin wax | 35 parts |
| Polyethylene wax | 5 parts |
| Xylene | 50 parts |
| Isopropanol | 10 parts |

SAMPLE 2

A thermal transfer sheet (Sample 2) according to the present invention was prepared in the same manner as in Sample 1 except that a sealing layer was formed by using the following composition (melt viscosity=28 cps at 100° C.)

| Coating liquid composition for a sealing layer | |
|---|---|
| Carnauba wax | 30 parts |
| Nonionic surfactant | 1 part |
| Isopropanol | 100 parts |
| Water | 30 parts |

SAMPLE 3

A thermal transfer sheet (Sample 3) according to the present invention was prepared in the same manner as in Sample 1 except that a sensitizing layer (thickness=1.0 g/m$^2$) was formed by using the following wax composition (melt viscosity=80 cps at 100° C.).

| Coating liquid composition for a sensitizing layer | |
|---|---|
| Carnauba wax | 19 parts |
| Vinyl chloride-vinyl acetate copolymer (Evaflex 210, mfd. by Mitsui Polychemical K.K.) | 1 part |
| Isopropanol | 60 parts |
| Water | 100 parts |

SAMPLE 4

A thermal transfer sheet (Sample 4) according to the present invention was prepared in the same manner as in Sample 1 except that a sensitizing layer (thickness=1.0 g/m$^2$) was formed by using the following wax composition (melt viscosity=50 cps at 100° C.).

| Coating liquid composition for a sensitizing layer | |
|---|---|
| Carnauba wax | 19 parts |
| Vinyl chloride-vinyl acetate copolymer (Evaflex 210, mfd. by Mitsui Polychemical K.K.) | 0.5 part |
| Isopropanol | 60 parts |
| Water | 100 parts |

SAMPLE 5

A thermal transfer sheet (Sample 5) according to the present invention was prepared in the same manner as in Sample 1 except that a sensitizing layer (thickness=1.5 g/m$^2$) was formed by using the following wax composition (melt viscosity=16 cps at 100° C.).

| Coating liquid oomposition for a sensitizing layer | |
|---|---|
| Candelilla wax | 30 parts |
| Surfactant for emulsion formation | 1 part |
| Isopropanol | 50 parts |
| Water | 50 parts |

SAMPLE 6

A thermal transfer sheet (Sample 6) according to the present invention was prepared in the same manner as in Sample 1 except that a heat-transferable ink layer (melt viscosity=2700 cps at 100° C.) was formed by heating the following ink composition up to 100° C. and applying the composition onto the surface of the same sensitizing layer as in Sample 1 by a hot-melt roller coating method so as to provide a coating amount of 8 g/m$^2$.

| Ink composition for formation of a transferable ink layer | |
|---|---|
| Carnauba wax | 20 parts |
| Ethylene-vinyl acetate copolymer (Sumitate KC-10, mfd. by Sumitomo Kagaku K.K.) | 20 parts |
| 150° F. paraffin wax | 45 parts |
| Carbon black | 35 parts |

SAMPLE 7

A thermal transfer sheet (Sample 7) according to the present invention was prepared in the same manner as in Sample 1 except that a heat-transferable ink layer (melt viscosity=1300 cps at 100° C.) was formed by heating the following ink composition up to 100° C. and applying the composition onto the surface of the same sensitizing layer as Sample 1 by a hot-melt roller coating method so as to provide a coating amount of 8 g/m$^2$.

| Ink composition for formation of a transferable ink layer | |
|---|---|
| Carnauba wax | 20 parts |
| Ethylene-vinyl acetate copolymer (Sumitate KC-10, mfd. by Sumitomo Kagaku K.K.) | 10 parts |
| 150° F. paraffin wax | 45 parts |
| Carbon black | 25 parts |

SAMPLE 8

A thermal transfer sheet (Sample 8) according to the present invention was prepared in the same manner as in Sample 3 except that a sealing layer was formed by using the following composition.

| Coating liquid composition for a sealing layer | |
|---|---|
| Carnauba wax | 25 parts |
| Calcium carbonate | 10 parts |
| Paraffin wax | 15 parts |
| Xylene | 60 parts |
| Isopropanol | 10 parts |

SAMPLE 9

A thermal transfer sheet (Comparative Sample 9) was prepared in the same manner as in Sample 1 except that the sensitizing layer and sealing layer were not formed.

SAMPLE 10

A thermal transfer sheet (Comparative Sample 10) was prepared in the same manner as in Sample 5 except that the sensitizing layer and sealing layer were not formed.

Each of the Samples as prepared above was subjected to printing by using an evaluation machine for N-fold recording mode (N=5) and the thus obtained results were compared with each other as shown in the following Table 5. The recording paper used herein was plain paper (Paper M, mfd. by Fuji Xerox K. K.).

TABLE 5

| | Ground staining | Trailing | Void | Resolution |
|---|---|---|---|---|
| Sample-1 | ○ | ○ | ○ | ○ |
| Sample-2 | ○ | ○ | ○ | ○ |
| Sample-3 | ○ | ○ | ○ | ○ |

TABLE 5-continued

| | Ground staining | Trailing | Void | Resolution |
|---|---|---|---|---|
| Sample-4 | ○ | ○ | ○ | ○ |
| Sample-5 | ○ | ○ | ○ | ○ |
| Sample-6 | ○ | ○ | ○ | ○ |
| Sample-7 | ○ | ○ | ○ | ○ |
| Sample-8 | ○ | ○ | ○ | ○ |
| Sample-9 | X | X | X | Δ |
| Sample-10 | ○ | Δ | X | Δ |

○: Good
Δ: Somewhat bad
X: Bad

EXAMPLE 6

Samples 1-10 were prepared in the following manner.

SAMPLE 1

A coating liquid having the following composition was applied onto the surface of the same substrate film having a back coating layer on the back surface thereof as in Sample 1 of Example 1 so as to provide a coating amount (after drying) of about 1.0 $g/m^2$ (a coating amount of 1.0 $g/m^2$ corresponds to a thickness of 1 μm, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, a composition comprising the following components was heated up to 100° C. and applied onto the surface of the above-mentioned sensitizing layer by a hot-melt roller coating method so as to provide a coating amount of 8 $g/m^2$, whereby a heat-transferable ink layer (melt viscosity=1700 cps at 100° C.) was formed.

| Ink composition for formation of a transferable ink layer | |
|---|---|
| Carnauba wax | 20 parts |
| Ethylene-vinyl acetate copolymer (Sumitate KC-10, mfd, by Sumitomo Kagaku K.K.) | 13 parts |
| 150° F. paraffin wax | 45 parts |
| Carbon black | 25 parts |

Thereafter, the following composition was heat up to 60° C., and was applied onto the above-mentioned ink layer by a hot lacquer gravure coating method using oblique grooves (angle=45°) so as to provide a coating amount of 2.0 $g/m^2$ and then dried to form thereon a surface layer, whereby a thermal transfer sheet (Sample 1) according to the present invention was obtained.

| Coating liquid composition for a surface layer | |
|---|---|
| Ethylene-vinyl acetate copolymer (Sumitate KC-10, mfd, by Sumitomo Kagaku K.K.) | 40 parts |
| Carnauba wax | 20 parts |
| 150° F. paraffin wax | 50 parts |
| Xylene | 100 parts |
| Isopropanol | 10 parts |

SAMPLE 2

A thermal transfer sheet (Sample 2) according to the present invention was prepared in the same manner as in Sample 1 except that a sensitizing layer (thickness=1.0 $g/m^2$) was formed by using 150° F. paraffin wax (melt viscosity =5 cps at 100° C.) and a surface layer was formed by using a gravure plate having an angle of 30° with respect to the moving direction.

SAMPLE 3

A thermal transfer sheet (Sample 3) according to the present invention was prepared in the same manner as in Sample 1 except that a sensitizing layer (thickness=1.0 $g/m^2$) was formed by using the following wax composition (melt viscosity=80 cps at 100° C.) and a surface layer was formed by using a gravure plate having an angle of 60° with respect to the moving direction.

| Coating liquid composition for a sensitizing layer | |
|---|---|
| Carnauba wax | 19 parts |
| Vinyl chloride-vinyl acetate copolymer (Evaflex 210, mfd. by Mitsui Polychemical K.K.) | 1 part |
| Isopropanol | 60 parts |
| Water | 100 parts |

SAMPLE 4

A thermal transfer sheet (Sample 4) according to the present invention was prepared in the same manner as in Sample 1 except that a sensitizing layer (thickness=1.0 $g/m^2$) was formed by using the following wax composition (melt viscosity=50 cps at 100° C.).

| Coating liquid composition for a sensitizing layer | |
|---|---|
| Carnauba wax | 19 parts |
| Vinyl chloride-vinyl acetate copolymer Evaflex 210, mfd. by Mitsui Polychemical k.k.) | 0.5 part |
| Isopropanol | 60 parts |
| Water | 100 parts |

SAMPLE 5

A thermal transfer sheet (Sample 5) according to the present invention was prepared in the same manner as in Sample 1 except that a sensitizing layer (thickness=1.5 $g/m^2$) was formed by using the following wax composition (melt viscosity=16 cps at 100° C.).

| Coating liquid composition for a sensitizing layer | |
|---|---|
| Carnauba wax | 30 parts |
| Surfactant for emulsion formation | 1 part |
| Isopropanol | 50 parts |
| Water | 50 parts |

SAMPLE 6

A thermal transfer sheet (Sample 6) according to the present invention was prepared in the same manner as in Sample 1 except that a heat transferable ink layer (melt viscosity=2700 cps at 100° C.) was formed by heating the following ink composition up to 100° C. and applying the composition onto the surface of the same sensitizing layer as in Sample 1 by a hot-melt roller coating method so as to provide a coating amount of 8 $g/m^2$.

| Ink composition for formation of a transferable ink layer | |
|---|---|
| Carnauba wax | 20 parts |
| Ethylene-vinyl acetate copolymer (Sumitate KC-10, mfd, by Sumitomo Kagaku K.K.) | 20 parts |
| 150° F. paraffin wax | 45 parts |
| Carbon black | 35 parts |

SAMPLE 7

A thermal transfer sheet (Sample 7) according to the present invention was prepared in the same manner as in Sample 1 except that a heat transferable ink layer (melt viscosity=1300 cps at 100° C.) was formed by heating the following ink composition up to 100° C. and applying the composition onto the surface of the same sensitizing layer as in Sample 1 by a hot-melt roller coating method so as to provide a coating amount of 8 g/m$^2$.

| Ink composition for formation of a transferable ink layer | |
|---|---|
| Carnauba wax | 20 parts |
| Ethylene-vinyl acetate copolymer (Sumitate KC-10, mfd, by Sumitomo Kagaku K.K.) | 10 parts |
| 150° F. paraffin wax | 45 parts |
| Carbon black | 25 parts |

SAMPLE 8

A thermal transfer sheet (Comparative Sample 8) was prepared in the same manner as in Sample 1 except that the sensitizing layer and surface layer were not formed.

SAMPLE 9

A thermal transfer sheet (Comparative Sample 9) was prepared in the same manner as in Sample 1 except that the sensitizing layer was not formed.

SAMPLE 10

A thermal transfer sheet (Comparative Sample 10) was prepared in the same manner as in Sample 3 except that 5 parts of the vinyl Chloride-vinyl acetale Coplymer used in Sample 3 was used instead of 1 part thereof so as to provide a melt viscosity of 1000 cps at 100° C.

Each of the Samples as prepared above was subjected to printing by using an evaluation machine for N-fold recording mode (N=6) and the thus obtained results were compared with each other as shown in the following Table 6. The recording paper used herein was TRW 1 (mfd. by Jujo Seishi K. K.).

TABLE 6

| | Ground staining | Trailing | Void | Resolution |
|---|---|---|---|---|
| Sample-1 | ○ | ○ | ○ | ○ |
| Sample-2 | ○ | ○ | ○ | ○ |
| Sample-3 | ○ | ○ | ○ | ○ |
| Sample-4 | ○ | ○ | ○ | ○ |
| Sample-5 | ○ | ○ | ○ | ○ |
| Sample-6 | ○ | ○ | ○ | ○ |
| Sample-7 | ○ | ○ | ○ | ○ |
| Sample-8 | X | X | X | Δ |
| Sample-9 | ○ | Δ | X | Δ |
| Sample-10 | ○ | Δ | X | Δ |

○: Good
Δ: Somewhat bad
X: Bad

EXAMPLE 7

Samples 1–4 were prepared in the following manner. First, the following composition was mixed under stirring and subjected to dispersion treatment for three hours by means of a paint shaker, and an appropriate amount of a diluting solvent (MEK/toluene=1/1) was added to the resultant mixture thereby to prepare an ink for a back coating layer.

| Ink composition for a back coating layer | |
|---|---|
| Styrene-acrylonitrile copolymer (Sebian AD, mfd. by Daisere Kogyo K.K.) | 6.0 parts |
| Linear saturated polyester resin (Eriter UE 3200, mfd, by Unitika K.K.) | 0.3 part |
| Zinc stearyl phosphate (LBT 1830, mfd, by Sakai Kagaku K.K.) | 3.0 parts |
| Crosslinked urea resin powder (Organic filler, mfd. by Nihon Kasei K.K. | 3.0 parts |
| Crosslinked melamine resin powder (Epstar S, mfd, by Nihon Kasei K.K.) | 1.5 parts |
| Solvent (MEK/toluene = 1/1) | 86.2 parts |

The above-mentioned ink was applied onto one surface side of a 6 μm-thick polyester film (Lumirror F-53, mfd. by Toray K. K.) by means of a wire bar coater so as to provide coating amounts of 0.2 g/m$^2$ and 0.5 g/m$^2$ (based on solid content) respectively, and then dried by using hot air, thereby to form a back coating layer.

The styrene-acrylonitrile copolymer used herein was as follows.

| | Molecular weight | AN mol % | DSC peak temperature |
|---|---|---|---|
| Sebian AD | 18.5 × 10$^4$ | 29.5% | 444° C. |

SAMPLE 1

A coating liquid having the following composition was applied onto the surface of the above-mentioned substrate film having the back coating layer as described above so as to provide a coating amount (after drying) of about 1.0 g/m$^2$ (a coating amount of 1.0 g/m$^2$ corresponds to a thickness of 1 μm, in the some manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, an ink composition comprising the following components was heated up to 100° C. and applied onto the surface of the above-mentioned sensitizing layer by a hot-melt roller coating method so as to provide a coating amount of 8 g/m$^2$, whereby a heat-transferable ink layer (melt viscosity=1700 cps at 100° C.) was formed.

| Ink composition for formation of a transferable ink layer | |
|---|---|
| Carnauba wax | 20 parts |
| Ethylene-vinyl acetate copolymer (Sumitate KC-10, mfd. | 13 parts |

-continued

| Ink composition for formation of a transferable ink layer | |
|---|---|
| by Sumitomo Kagaku K.K.) | |
| 150° F. paraffin wax | 45 parts |
| Carbon black | 35 parts |

Thereafter, the following composition was heated up to 60° C., and was applied onto the above-mentioned ink layer by a hot lacquer gravure coating method so as to provide a coating amount of 2.0 g/$m^2$ and then dried to form thereon a surface layer, whereby a thermal transfer sheet (Sample 1) according to the present invention was obtained.

| Coating liquid composition for a surface layer | |
|---|---|
| Ethylene-vinyl acetate copolymer (Sumitake KC-10, mfd. by Sumitomo Kagaku K.K.) | 40 parts |
| Carnauba wax | 20 parts |
| 150° F. paraffin wax | 50 parts |
| Xylene | 100 parts |
| Isopropanol | 10 parts |

SAMPLE 2

A thermal transfer sheet (Comparative Sample 2) was prepared in the same manner as in Sample 1 except that the sensitizing layer and surface layer were not formed.

SAMPLE 3

A thermal transfer sheet (Comparative Sample 3) was prepared in the same manner as in Sample 1 except that the sensitizing layer was not formed.

SAMPLE 4

A thermal transfer sheet (Comparative Sample 4) was prepared in the same manner as in Sample 1 except that a partially saponified vinyl chloride-vinyl acetate copolymer resin (Vinilite VAGH, mfd. by UCC) was used as a bindler resin constituting the ink for back coating layer.

Each of the Samples as prepared above was subjected to printing by using an evaluation machine for N-fold recording mode (N=6) and the thus obtained results were compared with each other as shown in the following Table 7. The recording paper used herein was TRW 1 (mfd. by Jujo Seishi K. K.).

TABLE 7

| Sample No. | Ground staining | Trailing | Void | Resolution |
|---|---|---|---|---|
| 1 | ○ | ○ | ○ | ○ |
| 2 | X | X | X | Δ |
| 3 | ○ | Δ | X | Δ |

When Sample 1 was subjected to printing on plain paper by using a thermal printer under conditions of an output of 1 W/dot, palse width of 0.3–4.5 m sec., and dot density of 3 dots/mm, no sticking phenomenon occurred, no wrinkle occurred, and the thermal transfer sheet was smoothly driven without causing no problem. On the other hands, Sample 4 caused considerable sticking phenomenon and was incapable of printing.

With respect to Samples 1 and 4, function coefficient, anti-staining property, and anti-sticking property were evaluated. The results are shown in the following Table 8.

TABLE 8

| Sample No. | 1 | | 4 | |
|---|---|---|---|---|
| Coating amount of each coating layer | 0.2 g | 0.5 g | 0.2 g | 0.5 g |
| Friction coefficient | | | | |
| Static | — | 0.15 | — | 0.21 |
| Dynamic | — | 0.13 | — | 0.18 |
| Anti-sticking property | | | | |
| Test-machine | ○ | ○ | X | X |
| Machine for practical use | ○ | ○ | X | X |
| Storability | | | | |
| 55° C. | ○ | ○ | X | X |
| 60° C. | ○ | ○ | X | X |

○: No problem
Δ: Somewhat problematic
X: Difficult to be used

FRICTION COEFFICIENT

The friction coefficient between the back coating layers was measured under a load of 100 g/cm at a speed of 100 mm/min.

ANTI-STRIKING PROPERTY

Device for Test thin film head 6 d/mm, 17 V,
2 ms=1.66 mJ/d
solid image

Device for Practical use partially grazed thin film head 8 d/mm, solid black image

STORABILITY

Storability test was conducted in the following manner. The ink coating surface of a test piece (50×50 mm) was superposed on the back coating layer thereof, and evaluation was conducted by using a blocking tester under a predetermined load under the following conditions.

i) 55° C., 5 kg/$cm^2$, 48 hours
ii) 60° C., 2 kg/$cm^2$, 24 hours

EXAMPLE 8

Samples 1-5 were prepared in the following manner.

A coating liquid comprising the following components was applied onto one surface side of a 6.0 μm-thick polyethylene terephthalate film by a gravure coating method in a coating amount of 10 g/$m^2$ (after drying), and then dried thereby to prepare a thermal transfer sheet (Sample 1) according to the present invention.

| Coating liquid for an ink layer | |
|---|---|
| Diurethane compound (n = 6, R = ethyl, mp = 74–75° C.) | 68 parts |
| Nitrocellulose | 36 parts |
| Carbon black | 42 parts |
| Oil-soluble black dye (Oil Black) | 8 parts |
| Silica (Siroid) | 1 part |
| Solvent | 350 parts |

SAMPLE 2

A thermal transfer sheet (Sample 2) according to the present invention was prepared in the same manner as in Sample 1 except that a primer layer comprising a vinyl chloride-vinyl acetate copolymer was formed on a substrate film so as to provide a thickness of 0.5 $g/m^2$ prior to the formation of an ink layer, and an ink layer was formed on the primer layer by using the coating liquid used in Sample 1 so as to provide a thickness of 12 $g/m^2$.

SAMPLE 3

A thermal transfer sheet (Sample 3) according to the present invention was prepared in the same manner as in Sample 1 except that the following coating liquid was used instead of that used in Sample 1.

| Coating liquid for an ink layer | |
|---|---|
| Diurethane compound (n = 6, R = n-propyl) | 68 parts |
| Nitrocellulose | 39 parts |
| Carbon black | 42 parts |
| Oil-soluble black dye (Oil Black) | 8 parts |
| Solvent | 300 parts |

SAMPLE 4

A thermal transfer sheet (Sample 4) according to the present invention was prepared in the same manner as in Sample 1 except that a primer layer was formed in the same manner as in Sample 2, and an ink layer having a two-layer structure comprising an under layer (thickness=8 $g/m^2$) and a surface layer (thickness=3 $g/m^2$) was formed by using the following coating liquids 1 (under layer) and 2 (surface layer) instead of the ink layer in Sample 1.

| Coating liquid 1 for an ink layer | |
|---|---|
| Diurethane compound (n = 6, R = ethyl) | 63 parts |
| Nitrocellulose | 13 parts |
| Carbon black | 22 parts |
| Oil-soluble black dye (Oil Black) | 20 parts |
| Solvent | 200 parts |
| Coating liquid 2 for an ink layer | |
| Diurethane compound (n = 6, R = ethyl) | 34 parts |
| Nitrocellulose | 79 parts |
| Carbon black | 66 parts |
| Silica | 10 parts |
| Solvent | 500 parts |

SAMPLE 5

An ink composition for transferable ink comprising the following components was prepared by using a blade kneader under heating and kneading at 90° C. for 6 hours.

| Ink composition for an ink layer | |
|---|---|
| Ester wax | 10 parts |
| Oxidized wax | 10 parts |
| Paraffin wax | 60 parts |
| Carbon black | 12 parts |

The above ink composition was heated up to 130° C. and applied onto a polyester film (the same as in Sample 1) by a hot-melt roller coating method so as to provide a coating amount of about 10 $g/m^2$ to obtain a thermal transfer sheet (comparative Sample 5).

Each of the Samples as prepared above was subjected to printing by using an evaluation machine for N-fold recording mode (N=3 to 5) and the thus obtained results were compared with each other as shown in the following table 9.

PRINTING CONDITIONS

Device used: Commercially available thermal printer
Printing energy: 4 mJ/dot (constant)
Transfer-receiving member: Image-receiving poper mfd. by Dai Nippon Insatsu K. K.

TABLE 9

| Sample No. | N = 3 | N = 4 | N = 5 |
|---|---|---|---|
| 1 | 1.1 | 1.0 | 0.9 |
| 2 | 1.1 | 0.9 | 0.8 |
| 3 | 0.9 | 0.8 | 0.7 |
| 4 | 1.1 | 1.0 | 0.9 |
| 5 | 0.5 | 0.4 | 0.3 |

The values shown in the above Table are image densities measure by means of a Macbeth reflection densitometer.

EXAMPLE 9

Samples 1-9 were prepared in the following manner.

SAMPLE 1

A coating liquid having the following composition was applied onto the surface of the same substrate film having a back coating layer on the back surface thereof as in Sample 1 of Example 1 so as to provide a coating amount (after drying) of about 1.0 $g/m^2$ (a coating amount of 1.0 $g/m^2$ corresponds to a thickness of 1 $\mu m$, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, an ink composition comprising the following components was heated up to 100° C. and applied onto the surface of the above-mentioned sensitizing layer by a hot-lacquer gravure coating method so as to provide a coating amount of 8 $g/m^2$, whereby a heat-transferable ink layer (melt viscosity=3000 cps at 100° C.) was formed.

| Ink composition for formation of a transferable ink layer | |
|---|---|
| Carnauba wax | 20 parts |
| Ethylene-vinyl acetate copolymer (Sumitate KA-10, mfd, by Sumitomo Kagaku K.K.) | 13 parts |
| 150° F. paraffin wax | 45 parts |
| Carbon black | 30 parts |
| Nigrosine dye | 9 parts |
| Xylene | 50 parts |
| Isopropanol | 10 parts |

Thereafter, the following composition was heated up to 60° C., and was applied onto the above-mentioned ink layer by a hot lacquer gravure coating method so as to provide a coating amount of 2.0 $g/m^2$ and then dried to form thereon a surface layer, whereby a thermal transfer sheet (Sample 1) according to the present invention was obtained.

| Coating liquid composition for a surface layer | |
|---|---|
| Ethylene-vinyl acetate copolymer (Evaflex #460, mfd. by Mitsui Polychemical) | 40 parts |
| Carnauba wax | 20 parts |
| 150° F. paraffin wax | 50 parts |
| Xylene | 100 parts |
| Isopropanol | 10 parts |

SAMPLE 2

A coating liquid having the following composition was applied onto the surface of the same substrate film having a back coating layer on the back surface thereof as in Sample 1 of Example 1 so as to provide a coating amount (after drying) of about 1.0 $g/m^2$ (a coating amount of 1.0 $g/m^2$ corresponds to a thickness of 1 μm, in the same manner as in the description appearing hereinafter), whereby a sensitizing layer (melt viscosity=28 cps at 100° C.) was formed.

| Coating liquid composition for a sensitizing layer | |
|---|---|
| Carnauba wax | 30 parts |
| Nonionic surfactant | 1 part |
| Isopropanol | 100 parts |
| Water | 30 parts |

Then, an ink composition comprising the following components was heated up to 100° C. and applied onto the surface of the above-mentioned sensitizing layer by a hot-lacquer gravure coating method so as to provide a coating amount of 8 $g/m^2$, whereby a heat-transferable ink layer (melt viscosity=3000 cps at 100° C.) was formed.

| Ink composition for formation of a transferable ink layer | |
|---|---|
| Carnauba wax | 20 parts |
| Ethylene-vinyl acetate copolymer (Evaflex KA-10, mfd. by Mitsui Polychemical K.K) | 13 parts |
| 150° F. paraffin wax | 45 parts |
| Carbon black | 30 parts |
| Nigrosine dye | 9 parts |

Thereafter, the following composition was heated up to 60° C., and was applied onto the above-mentioned ink layer by a hot lacquer gravure coating method so as to provide a coating amount of 2.0 $g/m^2$ and then dried to form thereon a surface layer, whereby a thermal transfer sheet (Sample 2) according to the present invention was obtained.

| Coating liquid composition for a surface layer | |
|---|---|
| Ethylene-vinyl acetate copolymer (Evaflex #460, mfd. by Mitsui Polychemical K.K.) | 40 parts |
| Carnauba wax | 20 parts |
| 150° F. paraffin wax | 50 parts |
| Xylene | 100 parts |
| Isopropanol | 10 parts |

SAMPLE 3

A thermal transfer sheet (Sample 3) according to the present invention was prepared in the same manner as in Sample 1 except that a sensitizing layer (thickness=1.0 $g/m^2$) was formed by using 150° F. paraffin wax (melt viscosity=5 cps at 100° C.) containing 5% of carbon black.

SAMPLE 4

A thermal transfer sheet (Sample 4) according to the present invention was prepared in the same manner as in Sample 1 except that a sensitizing layer (thickness=1.0 $g/m^2$) was formed by using the following wax composition (melt viscosity=80 cps at 100° C.).

| Coating liquid composition for a sensitizing layer | |
|---|---|
| Carnauba wax | 19 parts |
| Ethylene-vinyl acetate copolymer (Evaflex 210, mfd. by Mitsui Polychemical K.K.) | 1 part |
| Isopropanol | 60 parts |
| Water | 100 parts |

SAMPLE 5

A thermal transfer sheet (Sample 5) according to the present invention was prepared in the same manner as in Sample 1 except that a sensitizing layer (thickness=1.0 $g/m^2$) was formed by using the following wax composition (melt viscosity=50 cps at 100° C.).

| Coating liquid composition for a sensitizing layer | |
|---|---|
| Carnauba wax | 19 parts |
| Ethylene-vinyl acetate copolymer (Evaflex 210, mfd. by Mitsui Polychemical K.K.) | 0.5 part |
| Isopropanol | 60 parts |
| Carbon black | 10 parts |
| Water | 100 parts |

SAMPLE 6

A thermal transfer sheet (Sample 6) according to the present invention was prepared in the same manner as in Sample 1 except that a sensitizing layer (thickness=1.5 $g/m^2$) was formed by using the following wax composition (melt viscosity=16 cps at 100° C.).

| Coating liquid composition for a sensitizing layer | |
|---|---|
| Carnauba wax | 30 parts |
| Surfactant for emulsion formation | 1 part |
| Isopropanol | 50 parts |
| Water | 50 parts |

SAMPLE 7

A thermal transfer sheet (Sample 7) according to the present invention was prepared in the same manner as in Sample 1 except that a heat-transferable ink layer (melt viscosity=4500 cps at 100° C.) was formed by heating the following ink composition up to 100° C. and applying the composition onto the surface of the same sensitizing layer as in Sample 1 by a hot-melt roller coating method so as to provide a coating amount of 8 $g/m^2$.

| Ink composition for formation of a transferable ink layer | |
|---|---|
| Carnauba wax | 20 parts |
| Ethylene-vinyl acetate copolymer (Sumitate KA-10, mfd. by Sumitomo Kagaku k.k.) | 20 parts |
| 150° F. paraffin wax | 45 parts |

-continued

| Ink composition for formation of a transferable ink layer | |
|---|---|
| Carbon black | 30 parts |
| Oil Black | 5 parts |

SAMPLE 8

A thermal transfer sheet (Sample 8) according to the present invention was prepared in the same manner as in Sample 1 except that a heat-transferable ink layer (melt viscosity=2000 cps at 100° C.) was formed by heating the following composition up to 100° C. and applying the composition onto the surface of the same sensitizing layer as in Sample 1 by a hot-melt roller coating method so as to provide a coating amount of 8 g/m².

| Ink composition for formation of a transferable ink layer | |
|---|---|
| Carnauba wax | 20 parts |
| Ethylene-vinyl acetate copolymer (Sumitate KA-10, mfd. by Sumitomo Kagaku K.K.) | 10 parts |
| 150° F. paraffin wax | 45 parts |
| Carbon black | 25 parts |

SAMPLE 9

A thermal transfer sheet (Sample 9) according to the present invention was prepared in the same manner as in Sample 1 except that 5 parts of a synthetic wax was added to each of the compositions for the ink layer and surface layer, respectively.

Each of the Samples as prepared above was subjected to printing by using an evaluation machine for N-fold recording mode (N=6) and the thus obtained results were compared with each other as shown in the following table 10.

With respect to Samples 1 and 2, a thermal transfer paper having a Bekk smoothness of 50 sec. (trade name: Paper L, mfd. by Oji Seishi K.K.) was used as recording paper.

With respect to Samples 3 and 4, a thermal transfer paper having a Bekk smoothness of 220 sec. (trade name: TRW-1, mfd. by Jujo Seishi K.K.) was used as recording paper.

With respect to Samples 5 and 6, a thermal transfer paper having a Bekk smoothness of 458 sec. (trade name: TKP-13, mfd. by Kanzaki Seishi K.K.) was used as recording paper.

With respect to Samples 7, 8 and 9, a thermal transfer paper having a Bekk smoothness of 560 sec. (trade name: TRW-7, mfd. by Jujo Seishi K.K.) was used as recording paper.

Further, with respect to each of Samples 1 to 9, coating paper having a Bekk smoothness of 1700 sec. (trade name: Newton-N, mfd. by Kanzaki Seishi K.K.) and Bond paper (trade name: Gillert Bond) were used as recording papers, and printing was effected in the same manner as described above. The thus obtained results are also shown in the following Table 10.

TABLE 10

| | Thermal transfer paper having Bakk smoothness of 20–800 sec | | | | Coated paper having Bakk smoothness of 1700 sec | | | | Bond paper having Bakk smoothness of 5 sec | | | |
|---|---|---|---|---|---|---|---|---|---|---|---|---|
| Sample | Image density | Void | Drop-out | Resolution | Image density | Void | Drop-out | Resolution | Image density | Void | Drop out | Resolution |
| 1 | ○ | ○ | ○ | ○ | X | Δ | Δ | Δ | Δ | X | X | X |
| 2 | ○ | ○ | ○ | ○ | X | Δ | Δ | Δ | Δ | X | X | X |
| 3 | ○ | ○ | ○ | ○ | X | Δ | Δ | Δ | Δ | X | X | X |
| 4 | ○ | ○ | ○ | ○ | X | Δ | Δ | Δ | Δ | X | X | X |
| 5 | ○ | ○ | ○ | ○ | X | Δ | Δ | Δ | Δ | X | X | X |
| 6 | ○ | ○ | ○ | ○ | X | Δ | Δ | Δ | Δ | X | X | X |
| 7 | ○ | ○ | ○ | ○ | X | Δ | Δ | Δ | Δ | X | X | X |
| 8 | ○ | ○ | ○ | ○ | X | Δ | Δ | Δ | Δ | X | X | X |
| 9 | ○ | ○ | ○ | ○ | X | Δ | Δ | Δ | Δ | X | X | X |

What is claimed is:

1. A thermal transfer sheet which is to be used for an N-fold recording mode comprising a substrate film, an ink layer formed on one surface side of the substrate film, and a surface layer formed on the surface of the ink layer, wherein the ink layer has a melt viscosity of 1000–5000 cps at 100° C., and the surface layer has a melt viscosity of 2000–1000 cps at 150° C.

2. A thermal transfer sheet according to claim 1, wherein the ink layer contains carbon black and a black dye.

3. A thermal transfer sheet according to claim 1, wherein the ink layer has a pigment concentration of 20–70 wt. %

4. A thermal transfer sheet according to claim 1, wherein the ink layer has a thickness of 3–20 μm.

5. a thermal transfer sheet according to claim 1, wherein the ink layer comprises a wax and a thermoplastic resin as a vehicle.

6. A thermal transfer sheet according to claim 1, wherein the surface layer has a thickness of 0.1–5 μm.

7. A thermal transfer sheet according to claim 1, wherein the surface layer has been provided with minute unevenesses comprising oblique lines having an angle with respect to the moving direction.

8. A thermal transfer sheet according to claim 1, which has been wound around a core material and has an end detection mark on the back surface thereof disposed near to the binding part with the core material.

9. A thermal transfer sheet according to claim 1, which further comprises a colorless sealing layer formed on the surface layer.

10. A thermal transfer sheet according to claim 9, wherein the sealing layer has a melt viscosity of 20–100 cps at 100° C.

11. A thermal transfer sheet according to claim 1, which further comprises a sensitizing layer formed between the substrate film and the ink layer.

12. A thermal transfer sheet according to claim 11, wherein the sensitizing layer has a melt viscosity of 100 cps or lower at 100° C.

13. A thermal transfer sheet according to claim 11, wherein the sensitizing layer is a colored layer.

14. A thermal transfer sheet according to claim 11, wherein the sensitizing layer has been formed by the application of a wax emulsion.

15. A thermal transfer sheet according to claim 1, which further comprises a back coating layer disposed on the other surface of the substrate film; said back coating layer comprising a binder predominantly comprising a styrene acrylonitrile copolymer.

16. A thermal transfer sheet according to claim 15, which further comprises a sensitizing layer formed between the substrate film and the ink layer.

17. A thermal transfer sheet according to claim 15, wherein the sensitizing layer has a melt viscosity of 100 cps or lower at 100° C.

18. A thermal transfer sheet according to claim 15, wherein the styrene-acrylonitrile copolymer has an acrylonitrile copolymerization ratio of 20–40 mol. %.

19. A thermal transfer sheet according to claim 15, wherein the styrene-acrylonitrile copolymer has a molecular weight of $10\times10^4$ to $20\times10^4$.

20. A thermal transfer sheet according to claim 15, wherein a linear polyester resin has been mixed in the back coating layer as an adhesive resin.

21. A thermal transfer sheet according to claim 15, which further comprises a primer layer comprising a linear polyester resin formed between the substrate film and the back coating layer.

22. A thermal transfer sheet according to claim 1, which is to be superposed on a transfer-receiving material having a Bekk smoothness of 20–800 sec., and subjected to thermal transfer operation.

* * * * *